(12) United States Patent
Cole et al.

(10) Patent No.: US 11,014,465 B2
(45) Date of Patent: May 25, 2021

(54) METHOD AND APPARATUS FOR AUTOMATIC CHARGING OF ELECTRIC VEHICLES

(71) Applicant: ABB Schweiz AG, Baden (CH)

(72) Inventors: Gregory A. Cole, West Hartford, CT (US); Thomas A. Fuhlbrigge, Ellington, CT (US); Martin Krucinski, Glastonbury, CT (US); Alex Riley, Manchester, CT (US); William J. Eakins, Coventry, CT (US); Sang Choi, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 140 days.

(21) Appl. No.: 16/580,648

(22) Filed: Sep. 24, 2019

(65) Prior Publication Data
US 2021/0086640 A1    Mar. 25, 2021

(51) Int. Cl.
*B60L 53/35* (2019.01)
*B60L 53/16* (2019.01)
*B60L 53/14* (2019.01)

(52) U.S. Cl.
CPC ............... *B60L 53/35* (2019.02); *B60L 53/14* (2019.02); *B60L 53/16* (2019.02)

(58) Field of Classification Search
CPC .................................. B60L 53/35; B60L 53/16
See application file for complete search history.

(56) References Cited

U.S. PATENT DOCUMENTS

| | | | |
|---|---|---|---|
| 9,056,555 B1* | 6/2015 | Zhou | B60L 53/00 |
| 10,017,062 B2* | 7/2018 | Kufner | B60L 53/18 |
| 2013/0076902 A1* | 3/2013 | Gao | B60L 53/35 |
| | | | 348/148 |

OTHER PUBLICATIONS

International Searching Authority; International Search Report and Written Opinion dated Nov. 20, 2020 in corresponding international application No. PCT/2020/048920; 8 pp.

* cited by examiner

*Primary Examiner* — David V Henze-Gongola
(74) *Attorney, Agent, or Firm* — Taft Stettinius & Hollister LLP

(57) ABSTRACT

A method and apparatus for automatic charging of electric vehicles in which a plug head of a charging unit is automatically received in a receiving compartment of a vehicle charger actuation device. A push wall of the vehicle charger actuation device is displaced into contact the plug head in a manner that facilitates rotation of the plug head into angular alignment with the plug head receptacle. The charging unit can align a position of the plug head with the plug head receptacle such that continued displacement of the push wall displaces the plug head to a position at which the plug head is electrically coupled to the plug head receptacle. After a charging event, the push wall moves away from the plug head receptacle and engages a pull rod that is coupled to a pin skirt such that the pin skirt is displaced in a direction that ejects the plug head from the plug head receptacle.

20 Claims, 16 Drawing Sheets

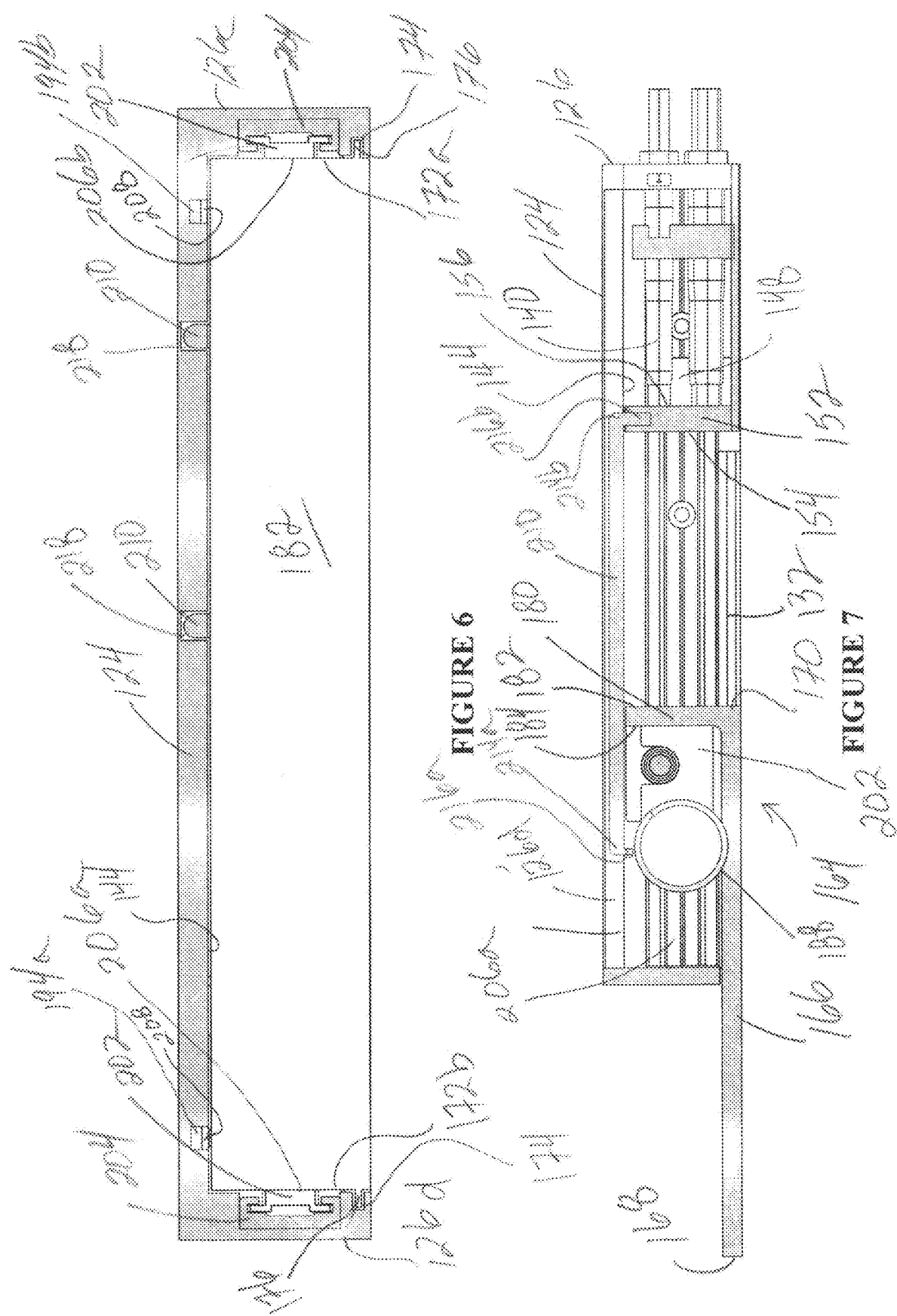

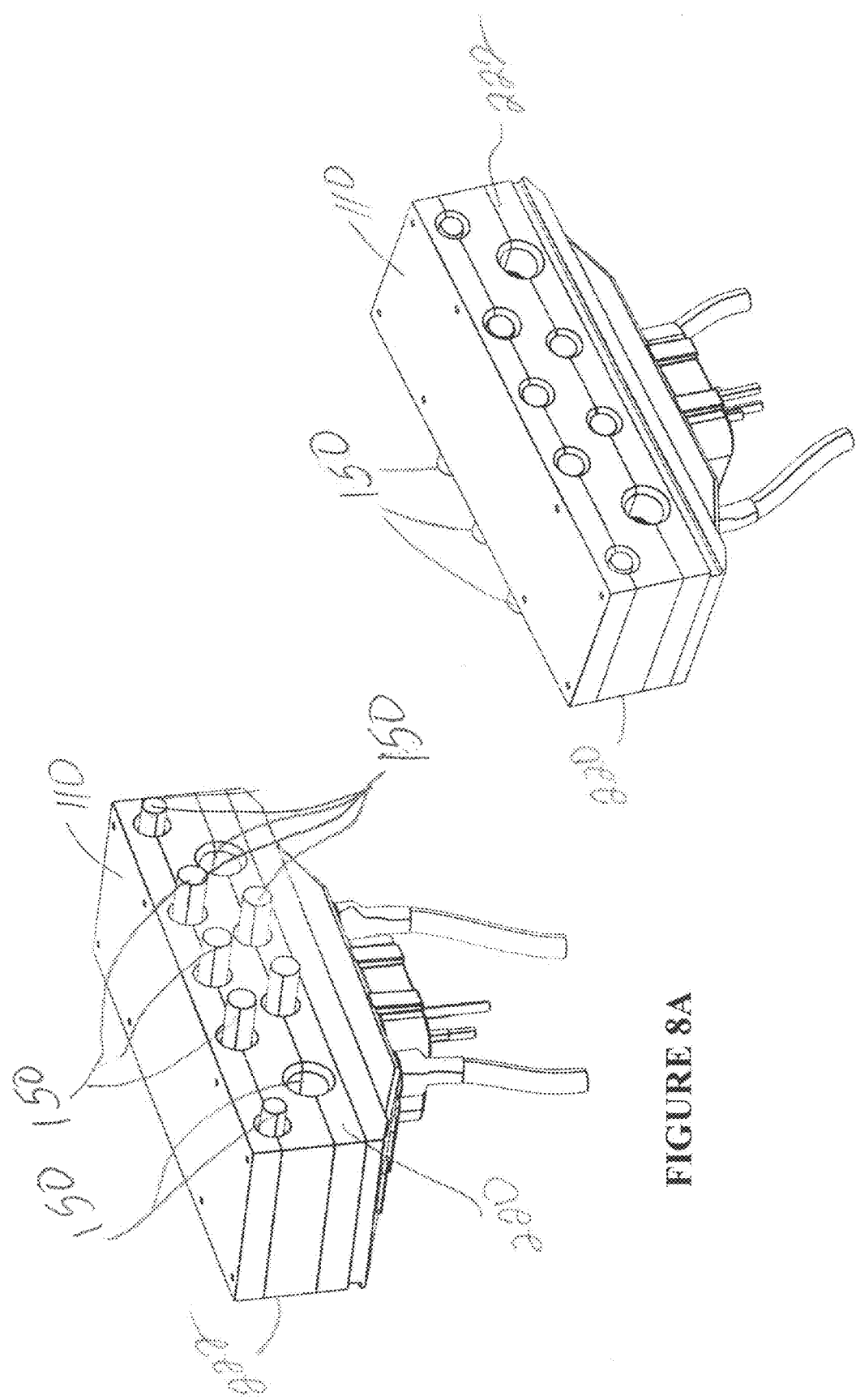

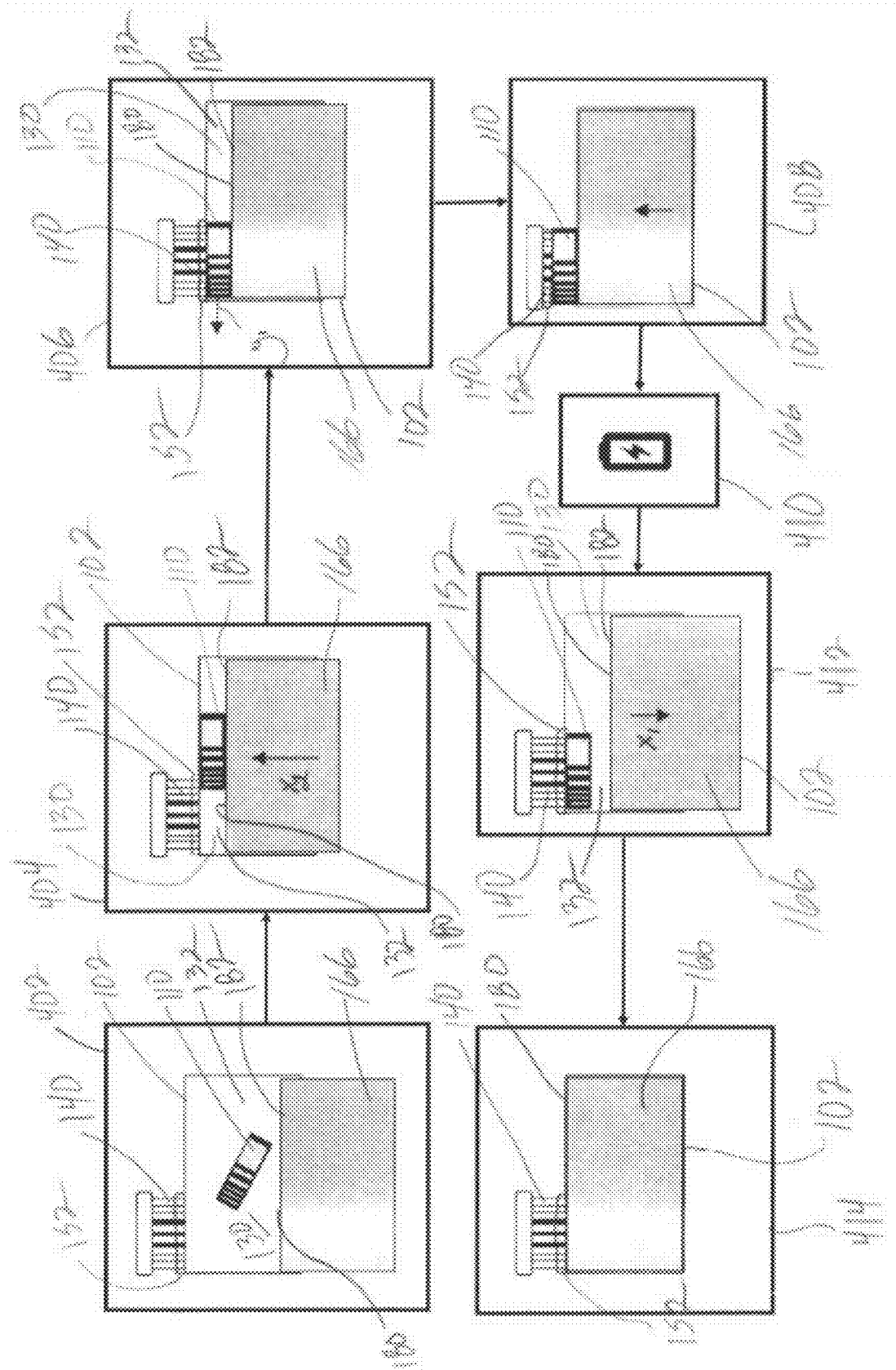

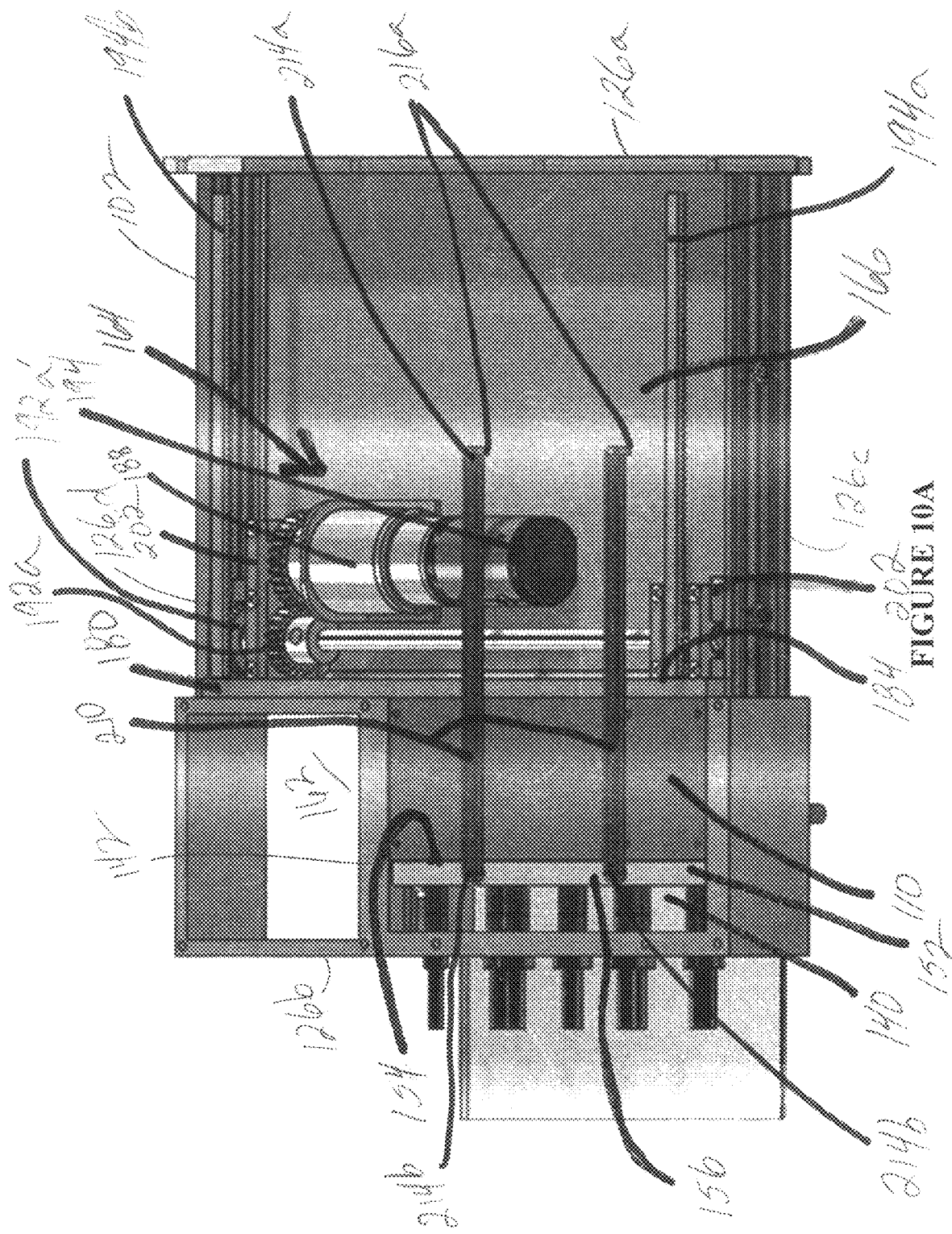

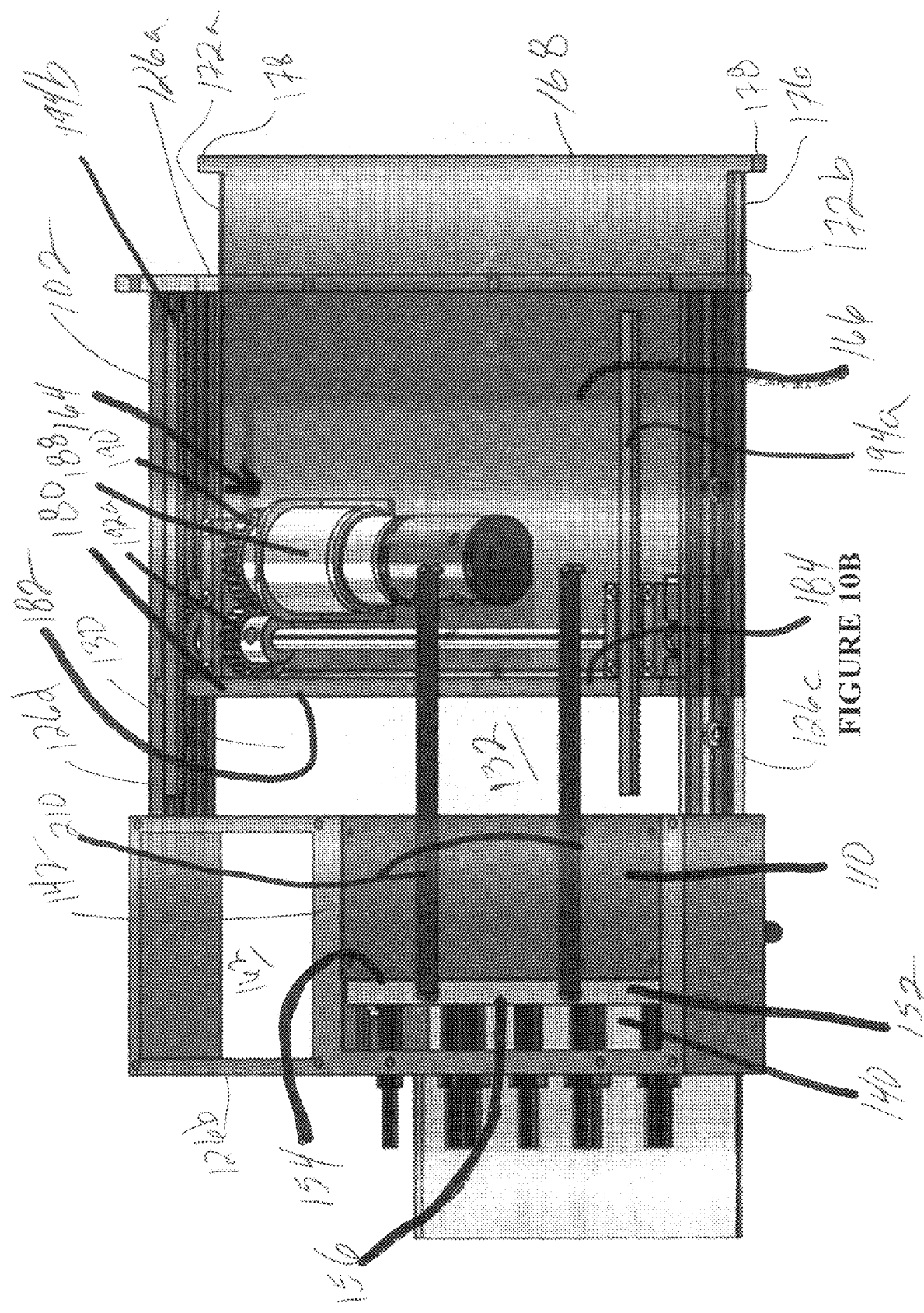

METHOD AND APPARATUS FOR AUTOMATIC CHARGING OF ELECTRIC VEHICLES

BACKGROUND

Embodiments of the present disclosure generally relate to automatic electric vehicle charging systems. More particularly, but not exclusively, embodiments of the present disclosure relate to vehicle charger actuation devices for automatic electric vehicle charging systems.

At least certain types of charging systems for electric vehicles involve an operator manually connecting an electrical connector of a charging station to a vehicle. Yet, such manual operation can require physical capabilities that not all drivers or operators of electric vehicles possess, as well as be time consuming. Further, given the degree of electrical power that can be transmitted in connection with charging at least certain types of electrical vehicles, such manual involvement with charging operations can present at least certain safety concerns.

Conversely, automated charging operations for electric vehicles can sometimes require infrastructure, including available space and economic capacity, that may prohibit such use of such automatic charging systems in at least certain environments or settings. For example, manners in which at least some types of vehicles are automatically charged may not necessarily be suitable for other types of vehicles and vehicle settings, including, but not limited to, passenger vehicles and associated residential environments or settings. Accordingly, there remains a need for further contributions in this area of technology.

BRIEF SUMMARY

An aspect of the present disclosure is a vehicle charger actuation device for selective electrical coupling to a plug head of an electrical charging unit. The vehicle charger actuation device can include a housing having an interior region and a plug head receptacle having an electrical connector that is configured for electrical coupling to the plug head of the electrical charging unit. The vehicle charger actuation device can also include a slider assembly having a push wall that is linearly displaceable within the interior region of the housing, and which has a pushing face. The pushing face can be configured to align a yaw orientation of the plug head with a yaw orientation of the plug head receptacle. The vehicle charger actuation device can also include a drive assembly that can be configured to selectively displace the slider assembly within the interior region. Additional, the vehicle charger actuation device can include a pin skirt that is slideably displaceable within the plug head receptacle, and at least one pull rod having a first end and a second end. The first end of the at least one pull rod can be positioned at a location within the interior region at which the first end is contacted by the slider assembly as the slider assembly is linerally displaced in a first direction away from the plug head receptacle. The second end of the at least one pull rod can be engaged with the pin skirt at least while the first end of the at least one pull rod is contacted by the slider assembly such that linear displacement of the slider assembly in the first direction is transmitted via the at least one pull rod to the pin skirt to displace the pin skirt in the first direction.

Another aspect of the present disclosure is a method that includes receiving, into a receiving compartment of a vehicle charger actuation device, a plug head of an electrical charging unit for an electric, and displacing a push wall of a slider assembly of the vehicle charger actuation device toward a plug head receptacle of the vehicle charger actuation device, the plug head receptacle having an electrical connector configured for electrical coupling to the plug head. A yaw orientation of the plug head can be aligned relative to at least the plug head receptacle via contact between the plug head and the push wall as the slider assembly is displaced toward the toward the plug head receptacle. Additionally, the plug head can be pushed into electrical contact with the electrical connector of the plug head receptacle via displacement of the slider assembly toward the plug head receptacle, and a pin skirt can be displaced away from an opening of the plug head receptacle as the plug head is displaced into electrical contact with the electrical connector of the plug head receptacle. The method can also include displacing the push wall away from the plug head receptacle, and pulling, by contact of the slider assembly with a pull rod as the slider assembly is displaced away from the plug head receptacle, the pin skirt toward the opening of the plug head receptacle. Further, the plug head can be displaced out of the plug head receptacle by contact between the pin skirt and the plug head as the pin skirt is pulled toward the opening of the plug head receptacle.

BRIEF DESCRIPTION OF THE DRAWINGS

The description herein makes reference to the accompanying figures wherein like reference numerals refer to like parts throughout the several views.

FIG. 6 illustrates a cross sectional view of a vehicle charger actuation device taken along line A-A in FIG. 2.

FIG. 7 illustrates a cross sectional view of a vehicle charger actuation device taken along line B-B in FIG. 2.

FIGS. 8A and 8B illustrate front side and rear side perspective views, respectively, of an exemplary plug head of an electrical charger unit that is configured to be electrical coupled to a vehicle charger actuation device.

FIG. 9B illustrates an operational sequence of an exemplary vehicle charger actuation device according to an illustrated embodiment of the subject application.

FIGS. 10A-10D illustrate a top side perspective view of a portion of a vehicle charger actuation device at different stages of operation as a plug head is being electrically disconnected, and positioned for ejection, from the vehicle charger actuation device according to an illustrated embodiment of the subject application.

Figure 1:
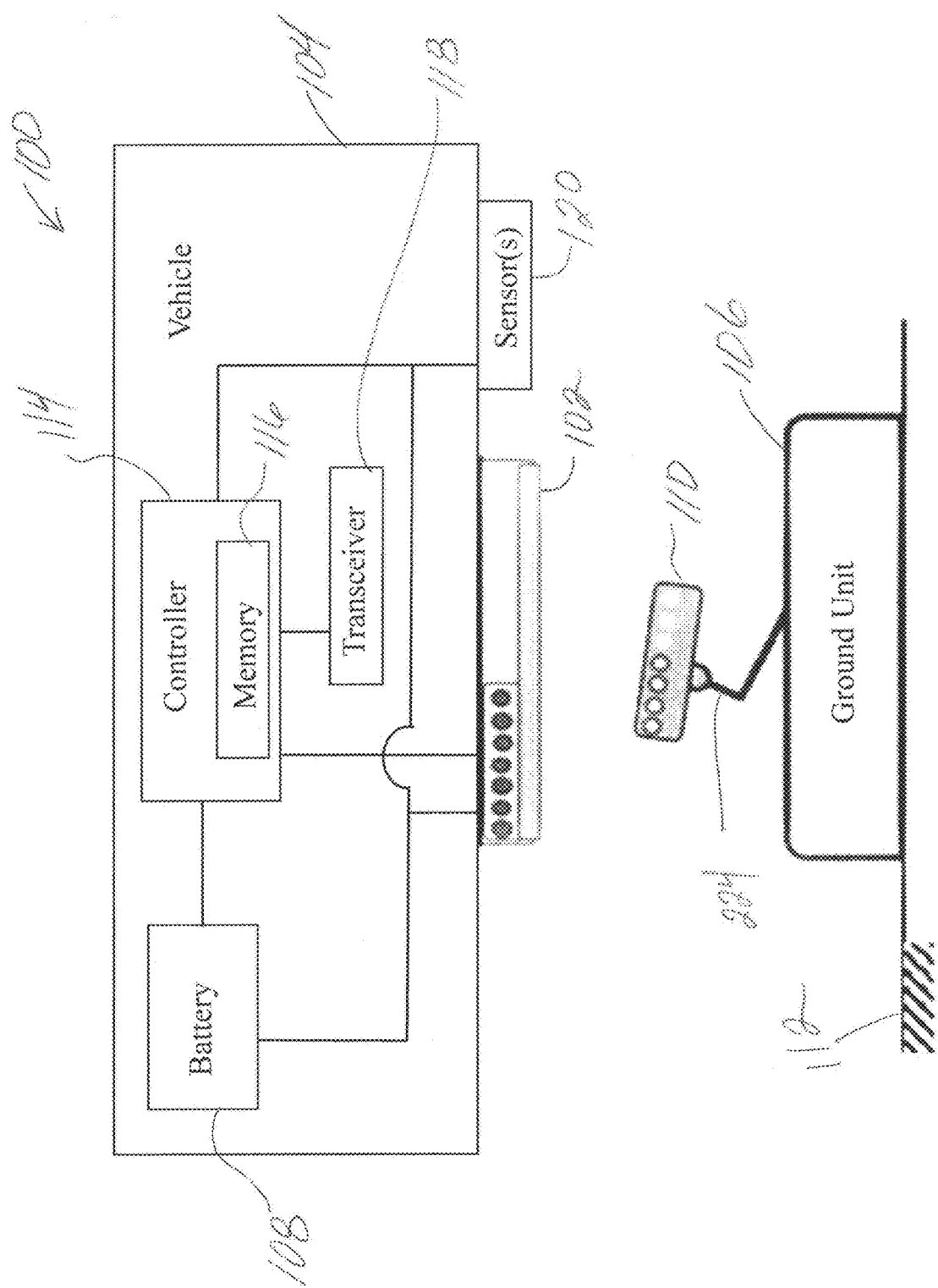
FIG. 1 illustrates a schematic representation of a portion of an exemplary automatic electric vehicle charging system having a vehicle charger actuation device according to an illustrated embodiment of the subject application.

The foregoing summary, as well as the following detailed description of certain embodiments of the present disclosure, will be better understood when read in conjunction with the appended drawings. For the purpose of illustrating the disclosure, there is shown in the drawings, certain embodiments. It should be understood, however, that the present disclosure is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a schematic representation of a portion of an exemplary automatic electric vehicle charging system 100 having a vehicle charger actuation device 102 according to an illustrated embodiment of the subject application. As shown, the vehicle charger actuation device 102 can be coupled, or otherwise attached, to an electrically rechargeable vehicle 104. The vehicle 104 can take a variety of different forms. For example, vehicles that can be used with the automatic electric vehicle charging system 100, include, and are not limited to, passenger vehicles, trucks, buses, commercial vehicles, industrial vehicles, on-road vehicles, and/or off-road vehicles, as well as a combination thereof, among other vehicles. Additionally, the vehicles used with the automatic electric vehicle charging system 100 can include a variety of different types of at least partially electrically rechargeable vehicles, including, for example, electrical vehicles that are commonly referred to as "EV", as well has hybrid electrical vehicles that can include both at least some form electric propulsion and another powertrain, such as, for example, a fossil fuel-powered powertrain.

The vehicle charger actuation device 102 is configured for selective electrical coupling to an electrical charger unit 106 that receives electrical power, such as, for example, electrical power from a power grid or other power utility source, among other power sources. Moreover, the electrical charger unit 106 and vehicle charger actuation device 102 can be selectively electrically coupled to each other, such as, for example, during electrical charging of a battery 108 or other power source for at least an electrical propulsion system of the vehicle 104, among other components of the vehicle 104. Accordingly, electrical power can generally flow from at least a portion of the electrical charger unit 106 to, or through, the vehicle charger actuation device 102 and be delivered to one or more batteries 108 of, or for use with, the vehicle 104. As discussed below, such electrical connections can include, but are not limited to, a plug head 110 of the electrical charger unit 106 being selectively electrically coupled to the vehicle charger actuation device 102. Further, according to certain embodiments, the vehicle charger actuation device 102 can be configured such that the electrical coupling, and subsequent decoupling, between the vehicle charger actuation device 102 and the electrical charger unit 106 can be automatic in that such coupling/decoupling can be done within direct manual engagement of the vehicle charger actuation device 102 and the electrical charger unit 106 by a user or operator. For example, as discussed below, according to certain embodiments, the electrical charger unit 106 can automatically position the plug head 110 at a location relative to the vehicle charger actuation device 102 such that at least a portion of the vehicle charger actuation device 102 and/or the electrical charger unit 106 can be displace in a manner or direction(s) that can displace the plug head 110 to a position at which the plug head 110 is electrically connected to a portion of the vehicle charger actuation device 102, and later displace the plug head 110 from being electrically connected to the vehicle charger actuation device 102.

The vehicle charger actuation device 102 can be positioned along and/or within the vehicle 104 at a variety of locations. For example, according to certain embodiments, the vehicle charger actuation device 102 can be positioned at or around the undercarriage or bottom side of the vehicle 104, as shown, for example, by FIG. 1. Further, the positioning of the vehicle charger actuation device 102 can be related to the positioning of the electrical charger unit 106, and vice versa. Thus, with respect to the exemplary embodiment depicted in FIG. 1, with the vehicle charger actuation device 102 positioned on the undercarriage of the vehicle 104, the electrical charger unit 106 can be positioned at, above, and/or beneath an adjacent ground surface 112. For example, according to certain embodiments, the electrical charger unit 106 is a ground unit that is positioned on, or, alternatively, at least partially recessed within and/or flush with a ground surface 112 that may be adjacent to, including underneath, a location at which the vehicle 104 may be at least temporarily positioned, such as, for example, parked.

As shown in FIG. 1, according to certain embodiments, in addition to being electrically coupled to one or more batteries 108, among other power storage devices, the vehicle charger actuation device 102 can also be in communication with a controller 114. The controller 114 can be dedicated to performing particular tasks associated with the operation of at least the vehicle charger actuation device 102, or can be used for a variety of other tasks related to the electrical charging for the vehicle 104, the operation of an electric propulsion system of the vehicle 104, and/or other tasks related to other operations of the automatic electric vehicle charging system 100.

The controller 114, which can be housed at variety of different locations within the vehicle 104, can include a processing device, such as, for example, a programmable, dedicated, and/or hardwired state machine, or any combination thereof. The processing device of the controller 114 can also include one or more processors such as, for example, Arithmetic-Logic Units (ALUs), Central Processing Units (CPUs), Digital Signal Processors (DSPs), or the like. Processing devices with multiple processing units can also utilize distributed, pipelined, and/or parallel processing. The processing device of the controller 114 can also be dedicated to performance of just the operations described herein, or can be utilized in one or more additional applications. In the depicted form, the processing device of the controller 114 is of a programmable variety that executes algorithms and processes data in accordance with operating logic as defined by programming instructions (such as software or firmware) stored in a memory 116 of the controller 114. Alternatively or additionally, the operating logic can be at least partially defined by hardwired logic or other hardware. The processing device of the controller 114 can include one or more components of any type suitable to process the signals received from at least the electrical charger unit 106, and to provide desired output signals. Such components can include digital circuitry, analog circuitry, or a combination of both.

The memory 116 can be included with the, and/or coupled to, the controller 114. Further, the memory 116 can be of one or more types, such as a solid-state variety, electromagnetic variety, optical variety, or a combination thereof. Additionally, the memory 116 can be volatile, nonvolatile, or a combination thereof, and some or all of the memory 116 can be of a portable variety, such as a disk, tape, memory stick, cartridge, or the like. In addition, according to certain embodiments, the memory 116 can store data that is manipulated by the operating logic of the processing device of the controller 114, such as data representative of signals received from a transceiver 118 that can be communicatively coupled to the electrical charger unit 106, in addition to, or in lieu of, storing programming instructions defining the operating logic.

The controller 114 can be communicatively coupled to one or more sensors 120 of the vehicle charger actuation device 102 and/or the automatic electric vehicle charging system 100. The sensors 120 may take a variety of different forms, including, but not limited to, proximity sensors, motion sensors, visual sensors, and video devices, among other types of sensors and devices. For example, as discussed below, according to certain embodiments, the sensors 120 can comprise one or more proximity sensors that can detect a position of a portion of the electrical charger unit 106, such as, for example, the plug head 110, relative to at least a portion of the vehicle charger actuation device 102.

Figure 2:
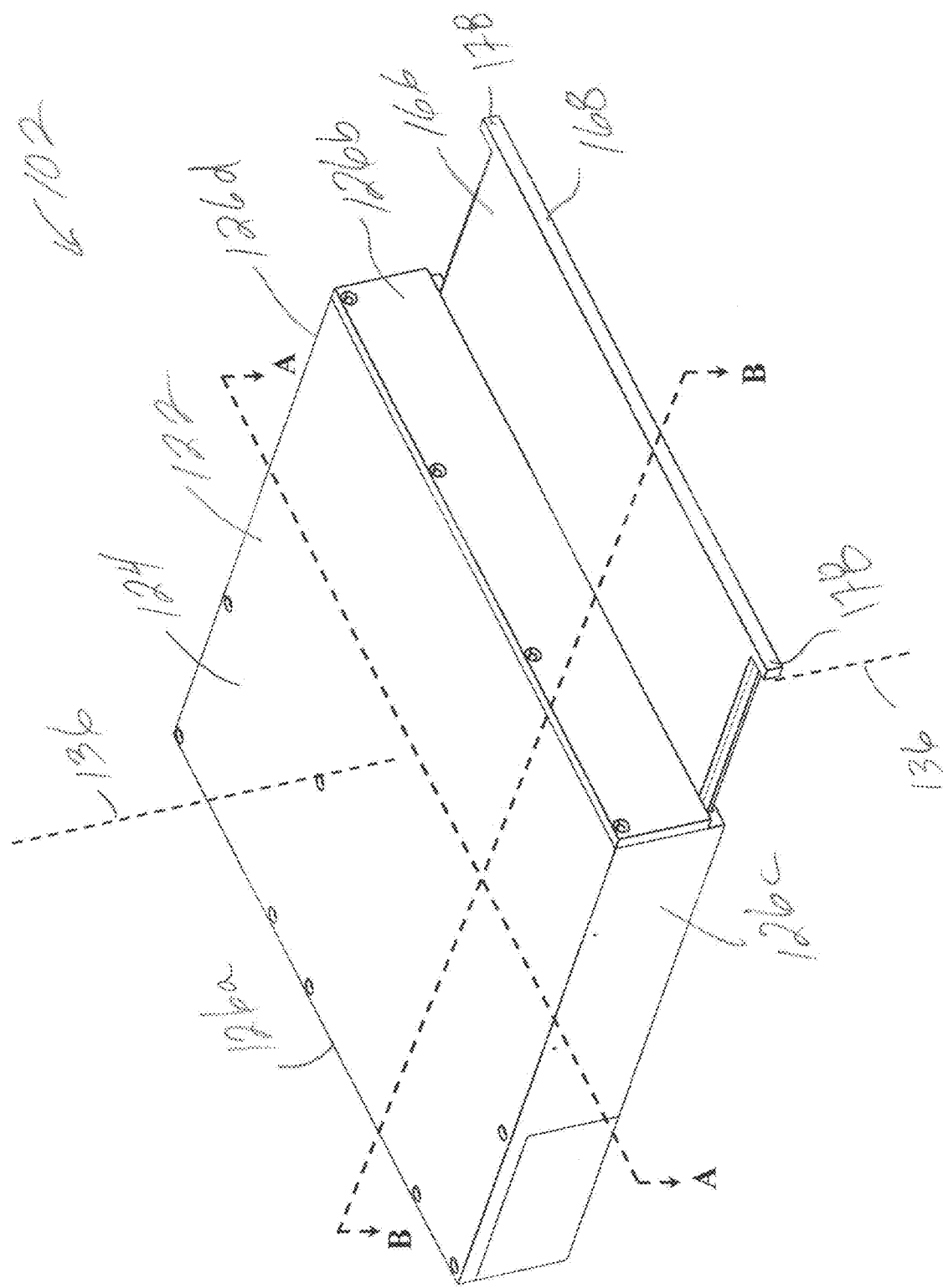
FIG. 2 illustrates a top side perspective view of a vehicle charger actuation device according to an illustrated embodiment of the subject application.
Figure 3:
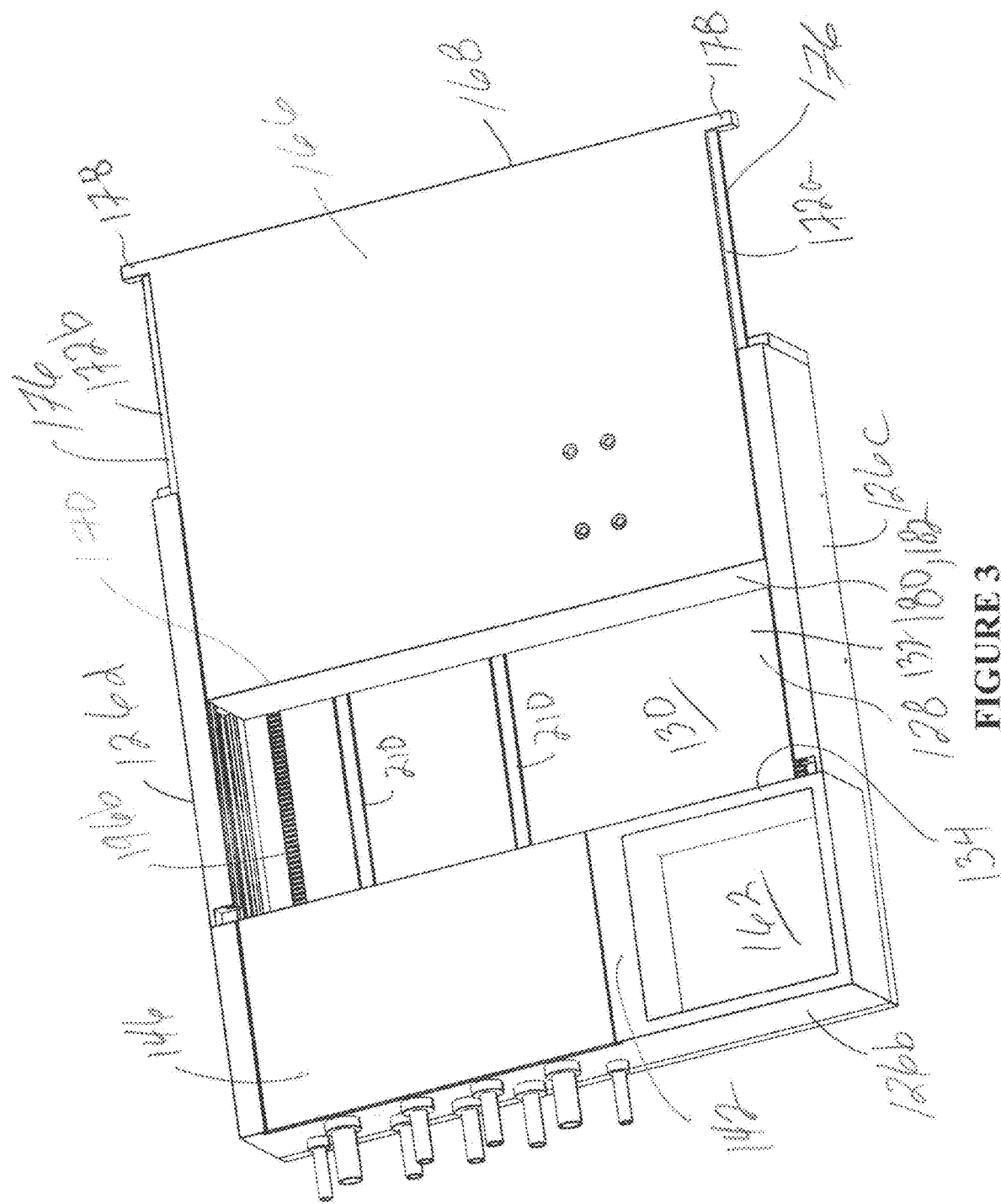
FIG. 3 illustrates a bottom side perspective view of a vehicle charger actuation device in a partially opened position according to an illustrated embodiment of the subject application.

FIGS. 2 and 3 illustrate top and bottom side perspective views, respectively, of an exemplary vehicle charger actuation device 102 according to an illustrated embodiment of the subject application. As shown, the vehicle charger actuation device 102 can include a housing 122 having at least top wall 124 and a plurality of sidewalls 126a-d. The plurality of sidewalls 126a-d can generally define an inner region 130 of the housing 122. Further, the sidewalls 126a-d can generally define an opening 128 at a side of the housing 122 that opposes the top wall 124, and which is in fluid communication with at least a portion of the inner region 130 of the housing 122. As least a portion of the opening 128 can be selectively covered by a displaceable cover 200 (FIGS. 11-13), as discussed below. Although the housing 122 is illustrated as having a generally square or rectangular shape, the housing 122 can have a variety of different shapes and sizes.

According to certain embodiments, at least portions of the inner region 130 of the housing 122 can be separated or divided from other portions of the inner region 130 by one or more walls or partitions, among other types of dividers. For example, the inner region 130 can include a receiving compartment 132 that is in fluid communication with the opening 128. The receiving compartment 132 can generally include a portion of the inner region 130 between a push wall 180 of a slider assembly 164 and at least an opposing first partition 134 that is positioned within the inner region 130, as well as two opposing sidewalls 126c, 126d of the housing 122. As discussed below, according to certain embodiments, the size of the receiving compartment 132 can be adjusted as the distance between the push wall 180 and the first partition 134 is adjusted during operation of the vehicle charger actuation device 102.

The first partition 134 can be positioned between the opposing first and second sidewalls 126c, 126d of the housing 122, and be spaced from the rear sidewall 126b by at least a distance that can accommodate the receipt of the plug head 110 of the electrical charger unit 106 in the receiving compartment 132 at a variety of rotational orientations relative to the vehicle charger actuation device 102. Thus, for example, the receiving compartment 132 can be sized to receive the plug head 110 when the plug head 110 is at a variety of yaw orientations or positions, as indicated, for example, by the yaw axis 136 shown in FIG. 2 that generally extends through the top wall 124 and opening 128 of the housing 122. Although the receiving compartment 132 can have a variety of shapes and sizes, according to certain embodiments, the receiving compartment 132 has a generally rectangular or square configuration.

Figure 4:
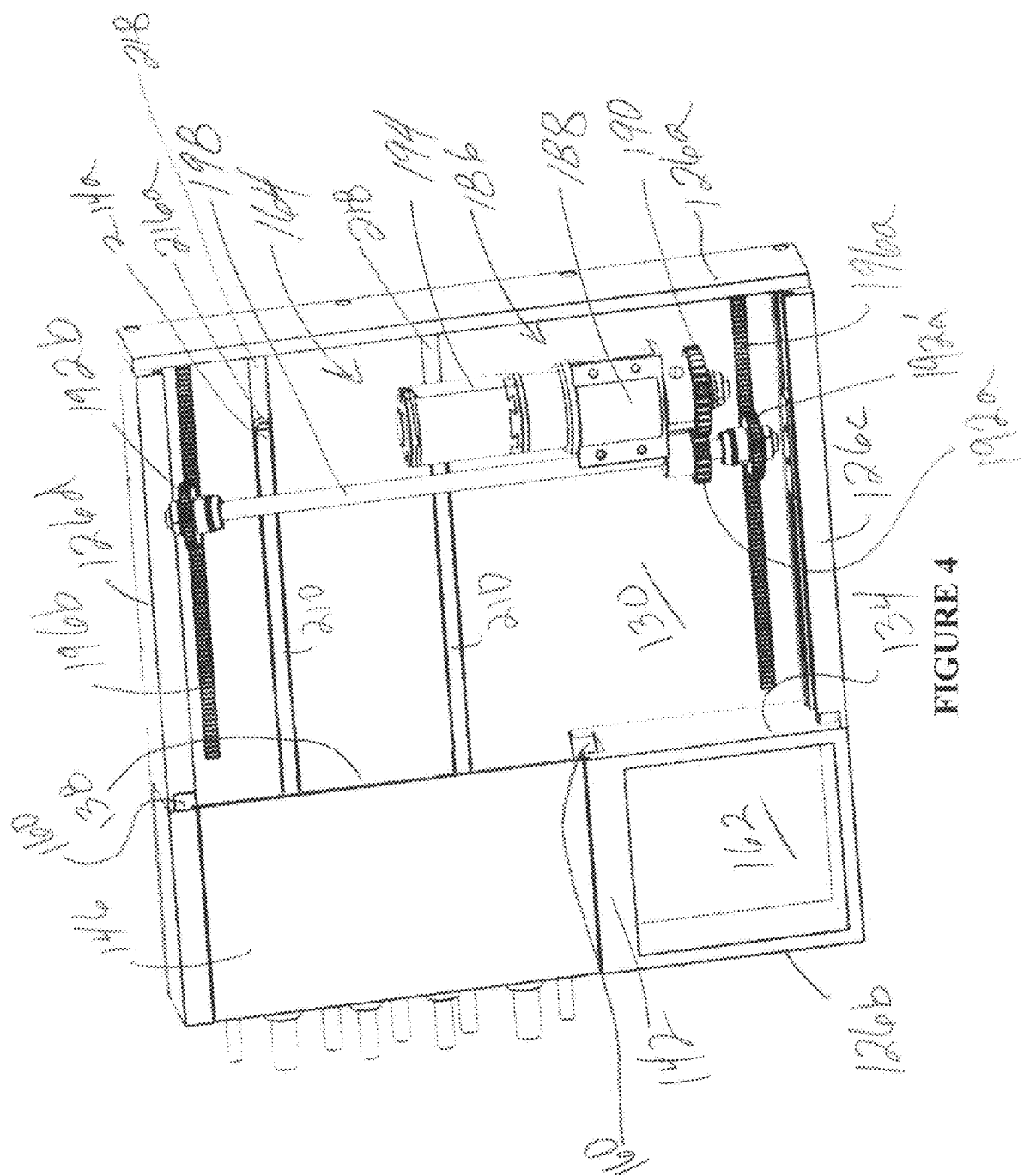
FIG. 4 illustrates a bottom side perspective view of a portion of the vehicle charger actuation device shown in FIG. 3.
Figure 5:
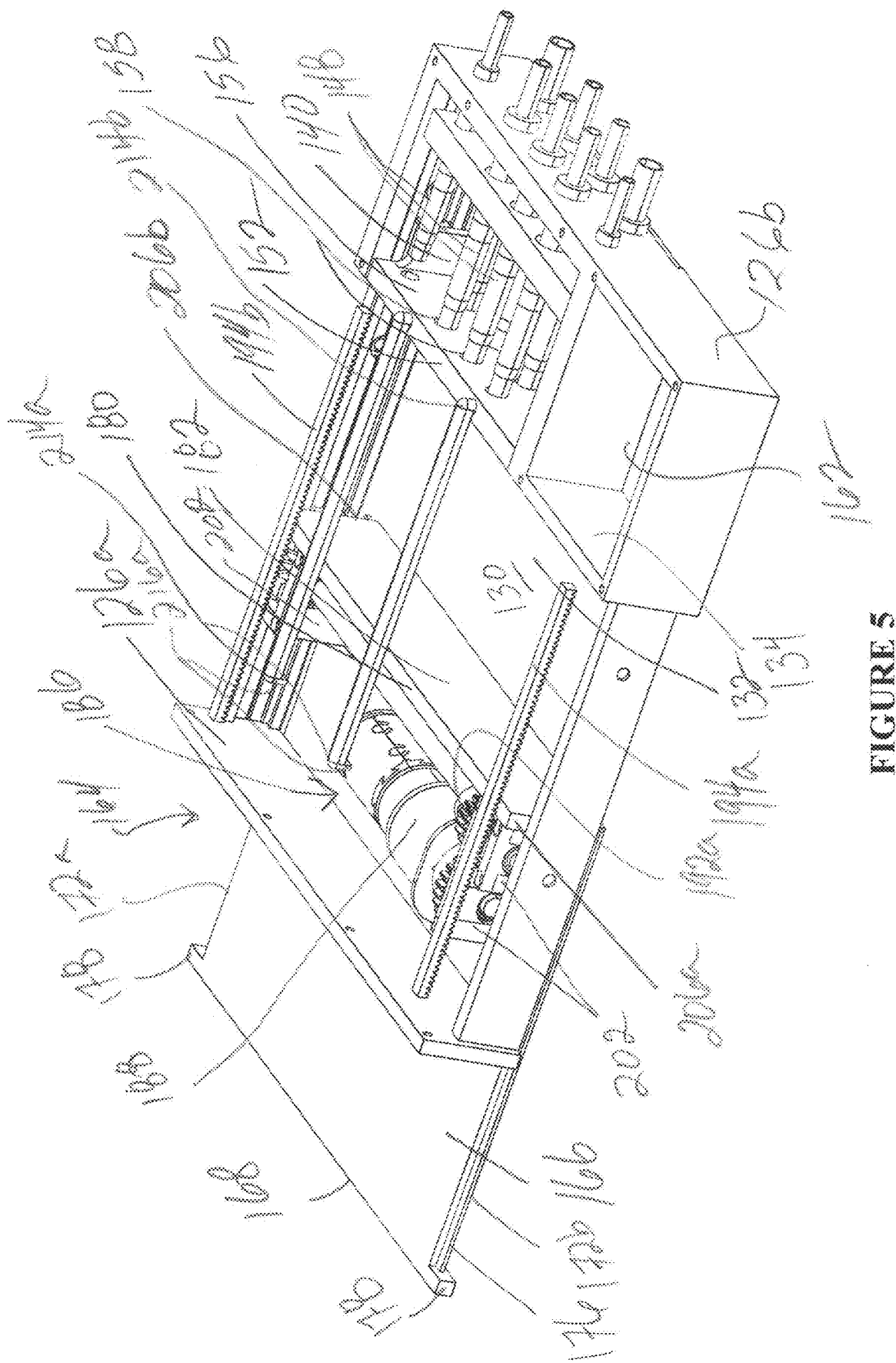
FIG. 5 illustrates a top side perspective view of a portion of the vehicle charger actuation device shown in FIGS. 3 and 4.

As shown in at least FIGS. 4 and 5, the first partition 134 can be spaced away from the first sidewall 126c, or otherwise include an area that is configured, to accommodate an opening 138 of a plug head receptacle 140 that is positioned at least within a portion of the inner region 130 of the housing 122. According to certain embodiments, the plug head receptacle 140 can be a portion of the inner region 130 of the housing 122 that is generally positioned between the first partition 134 and the rear sidewall 126b of the housing 122, and between a first sidewall 126c and a second partition 142. According to the illustrated embodiment, the second partition 142 is generally perpendicular to the first partition 134 and positioned between the first partition 134 and the rear sidewall 126b. Further, as shown by at least FIG. 7, the plug head receptacle 140 can also be positioned generally between an inner surface 144 of the top wall 124 and a floor plate 146 of the plug head receptacle 140.

The plug head receptacle 140, which is in fluid communication with the receiving compartment 132 so as to accommodate, during operation of the electric vehicle charging system 100, passage of the plug head 110 from the receiving compartment 132 to the plug head receptacle. Further, the plug head receptacle 140 is sized to receive placement of the plug head 110 of the electrical charger unit 106 through the opening 138 and into at least a portion of the plug head receptacle 140. Further, the plug head receptacle 140 includes one or more electrical connectors 148 that are configured to matingly engage corresponding electrical connectors 150 of the plug head 110 such that an electrical connection can be established between the vehicle charger actuation device 102 and the electrical charger unit 106. For example, according to certain embodiments, the plug head receptacle 140 can include one or more electrical connectors 148 that are in the form of one or more pins and/or one or more sockets, that mate with a corresponding connector(s) 150 of the plug head 110 (FIG. 8A). Accordingly, the plug head receptacle 140 can be sized to accommodate receipt of at least a portion of the plug head 110 when the plug head 110 is at least gernally aligned with the plug head receptacle 140 so that the electrical connectors 148, 150 of the plug receptacle 140 and the plug head 110 matingly engage each other.

The plug head receptacle 140 can also include a pin skirt 152 that can be linearly displaced within the plug head receptacle 140 between a first position for the pin skirt 152 at which the pin skirt 152 is at least proximally adjacent to the opening 138 of the plug head receptacle 140, to a second position for the pin skirt 152 at which the pin skirt 152 is generally in closer proximity to the rear sidewall 126b of the housing 122 than to the opening 138 of the plug head receptacle 140, as shown, for example, in FIGS. 5 and 7. Such displacement of the pin skirt 152 from the first position to the second position of the pin skirt 152 can correspond to the plug head 110 of the electrical charger unit 106 being received within the plug head receptacle 140 and displaced to a position at which the plug head 110 is electrically coupled to the vehicle charger actuation device 102. Further, as discussed below, displacement of the pin skirt 152 from the second position to the first position of the pin skirt 152 can correspond to the plug head 110 of the electrical charger unit 106 being ejected or removed from the plug head receptacle 140, and thus associated with the plug head 110 being electrically disconnected from the vehicle charger actuation device 102.

As seen by at least FIG. 7, according to certain embodiments, the pin skirt 152 has opposing front and rear sides 154, 156. Additionally, as indicated by FIG. 5, the pin skirt 152 can have one or more orifices 158 that extend through the pin skirt 152 and around corresponding electrical connectors 148 of the plug head receptacle 140 so as to accommodate linear displacement of the pin skirt 152 between the first position and the second position of the pin skirt 152. Such electrical connectors 148 that extend through the pin skirt 152 can at least assist in guiding the liner displacement of the pin skirt 152 as the pin skirt 152 is displaced between the first and second positions. Additionally, or alternatively, as seen in at least FIG. 4, portions of the second partition 142 and the and first sidewall 126c that are adjacent to the pin skirt 152 can each include a pin skirt guide recess 160 that can slidingly receive a portion of the sidewall of the pin skirt 152 in manner that can at least guide and/or support the pin skirt 152 as the pin skirt 152 is linearly displaced within the plug head receptacle 140.

As also shown in at least FIG. 3, according to certain embodiments, the inner region 130 of the housing 122 can also include an auxiliary compartment 162 that is position between the first partition 134 and the rear sidewall 126b of the housing 122, and between a second sidewall 126d and the second partition 142. Thus, as shown in FIG. 3, the plug head receptacle 140 and the auxiliary compartment 162 can be positioned on opposing sides of the second partition 142. The auxiliary compartment 162 can have a size, such as, for example, a width between the second sidewall 126d and the second partition 142, that can accommodate the plug head receptacle 140 having a width between the first sidewall 126c and the second partition 142 that can accommodate the plug head receptacle 140 being able to receive insertion of the plug head 110. Further, according to certain embodiments, the auxiliary compartment 162 can be configured to house various components related to the operation of the vehicle charger actuation device 102 and/or the automatic electric vehicle charging system 100, including, for example, but not limited to, the controller 114 and/or the transceiver 118, among other components.

The vehicle charger actuation device 102 can also include a slider assembly 164 that is selectively linearly displaceable along at least a portion of the housing 122. The slider assembly 164 can be linearly displaced within at least a portion of the inner region 130 of the housing 122 that is between the front sidewall 126a and the first partition 134. Additionally, the slider assembly 164 can include a base 166 that has a first end 168 and a second end 170, as well as opposing first and second sidewalls 172a, 172b. As shown by at least FIG. 6, a portion of both the first and second sidewalls 172a, 172b are configured to each be slidingly positioned within a base guide recess 174 that is positioned along inner surfaces of the adjacent first and second sidewalls 126c, 126d of the housing 122. The base guide recesses 174 can be configured to at least assist in guiding the linear displacement of the slider assembly 164. Further, according to the illustrated embodiment, at least a portion of the first and second sidewalls 172a, 172b of the base 166 can both include outwardly extending protrusions 176 that are received within, and can slide along the base guide recess 174.

As also shown in at least FIG. 5, the first end 168 of the base 166 can include outwardly extending extensions 178 that are generally adjacent to the first and second sidewalls 172a, 172b of the base 166. Such extensions 178 can, according to certain embodiments, be configured to be displaced into a position to abut or generally be adjacent to a portion of the opposing first and second sidewalls 126c, 126d of the housing 122 so as to at least assist in preventing the entrance of external debris or contaminants into the base guide recesses 174, among other portions of the inner region 130 of the housing 122 at least when the vehicle charger actuation device 102 is not in use, and/or can provide a stopper that limits the extent the slider assembly 164 can be displaced in at least one linear direction.

The slider assembly 164 can also include a push wall 180 that can be coupled to the second end 170 of the base 166, and which is linearly displaced with the linear displacement of the base 166 along at least a portion of the receiving compartment 132 of the inner region 130 of the housing 122. Further, the push wall 180 can include a rear or pushing face 182 that can be generally parallel to, and which faces, the first partition 134. The push wall 180 can also include a front face 184, the front face 184 and the rear face 182 being on opposing sides of the push wall 180.

The slider assembly 164 can further include a drive assembly 186 that can be configured to provide one or more forces to at least linearly displace the slider assembly 164 between a first position and a second position. According to the illustrated embodiment, the push wall 180 and the second end 170 of the base 166 are in relatively close proximity to, if not abut, the first partition 134 when the slider assembly 164 is at the second position, and relatively distance from the first partition 134 when the slider assembly 164 is at the first position. The drive assembly 186 can include at least one driver 188, such as, for example, an electric motor, at least one driver member 190, and at least one driven member 192. The driver 188 can include an encoder 194 that is communicatively coupled to the controller 114. According to at least certain configurations, the controller 114 can communicate signals and/or electrical power to the encoder 194 that is used to operate the driver 188, including, but not limited to, signals that can commence and/or cease operation of the driver 188, as well as signals that can indicate a direction of operation of the driver 188, such as, for example, whether a drive shaft of the driver 188 is to be rotated in a first rotational direction, or a second, opposite rotational direction.

The driver member 190, which can, for example, be a gear, can be attached, or otherwise coupled directly, to the driver 188 such that an input force, such as, for example, a rotation force from a drive shaft of the driver 188, is generally directly transferred to the driver member 190. According to the illustrated embodiment, the driven member 192 can include a first pinion 192a that mating engages the driven member 192. Additionally, the drive assembly 186 can include at least a first rack 196a that matingly engages the first pinion 192a, or, as shown in at least FIG. 4, an additional pinion 192a' that is directly or indirectly coupled to, or part of a unitary portion of, the first pinion 192a, so as to provide a first rack and pinion arrangement. Additionally, as shown in at least FIGS. 4 and 5, according to certain embodiments, the drive assembly 186 can further include a second driven member 192, such as, for example, a second pinion 192b and a mating second rack 196b. According to certain embodiments, a drive shaft 198 can couple the first pinion 192a and/or additional pinion 192a' to the second pinion 192b such that the rotational force that facilitates rotational displacement of the first pinion 192a and/or the additional pinion 192a' by operation of the driver 188 and associated rotation of the driver member 190 can also be transmitted to the second pinion 192b via the drive shaft 198.

According to certain embodiments, at least a portion of the drive assembly 186 can be coupled to the slider assembly 164 such that, during operation of the drive assembly 186, at least a portion of the drive assembly 186 and the slider assembly 164 are linearly displaced together. For example, as shown in at least FIGS. 5 and 7, the driver 188, driven member 192, first pinion 192a, and second pinion 192b can be coupled, or otherwise attached, to at least the base 166 and/or push wall 180, among other portions of the slider assembly 164, by one or more brackets 202. The brackets 202 can be attached to the slider assembly 164 in a variety of different manners, including, for example, via one or more mechanical fasteners, including, but not limited to, bolts, screws, and/or pins, as well as welded to the slider assembly 164, or, alternatively, form with the slider assembly 164 a monolithic structure, among other forms of connection. As shown in FIGS. 5-7, the bracket(s) 202 can be configured to be slidingly positioned within an adjacent bracket guide recess 204 that is positioned along, or otherwise coupled to, the inner surface of the adjacent first and second sidewalls 126c, 126d of the housing 122. The bracket guide recesses 204 can be configured to at least assist in guiding the linear displacement of the bracket(s) 202, and thus the slider assembly 164, between first and second positions.

According to certain embodiments, the drive assembly 186 and associated bracket(s) 202 can be arranged such that the first and second pinions 192a, 192b are positioned adjacent to opposing first and second ends 206a, 206b of the push wall 180. Such positioning of the first and second pinions 192a, 192b relative to the push wall 180 can assist in balancing or distributing the force(s) exerted against the push wall 180 as the push wall 180 engages and displaces the plug head 110, as discussed below. Moreover, such a configuration can assist with providing a generally constant linear force across the pushing face 182 as the pushing face 182 exerts a force against, and displaces, the plug head 110, which can at least assist in preventing premature wear or other related damage to the slider assembly 164 and/or drive assembly 186, as well as facilitate a generally more even movement of the push wall 180 and/or slider assembly 164.

As shown by at least FIG. 6, according to certain embodiments, the first and second racks 196a, 196b can be coupled or otherwise attached to an inner surface 144 of the top wall 124 of the housing 122, or otherwise form a monolithic structure with the top wall 124, such that the first and second racks 196a, 196b remain in a generally static position relative to the housing 122 and/or slider assembly 164.

Further, as shown in FIG. 6, according to certain embodiments, the first and second racks 196a, 196b can be at least partially, if not fully, recessed within associated recesses 208 in the inner surface 144 of the top wall 124 such that the racks 196a, 196b do not interfere with the linear displacement of the push wall 180 as the push wall 180 is displaced within the inner region 130 of the housing 122.

As seen in at least FIGS. 5 and 7, the vehicle charger actuation device 102 can also include one more pull rods 210 that can at least assist in displacing the pin skirt 152. According to the illustrated embodiment, the vehicle charger actuation device 102 has two pull rods 210, each pull rod 210 extending from a first end 210 to a second end 212 of the pull rod 210. Further, the pull rod 210 can have a length between the first and second ends 210, 212 of the pull rod 210 such that the pull rod 210 can, in at least certain situations, simultaneously be operably engaged, and/or coupled, to both the push wall 180 and the pin skirt 152. For example, according to the illustrated embodiment, the first end 210 of the pull rod 210 can include a hook or tab 216a that extends generally downwardly in the direction of the base 166, and is positioned to be engaged by the front face 184 of the push wall 180 at least at some point during the linear displacement of the slider assembly 164 in the first direction as the slider assembly moves away from both the first partition 134 and the plug head receptacle 140. Additionally, according to certain embodiments, the second end 212 of the pull rod 210 can also include a hook or tab 216b that extends generally downwardly direction toward the base 166. According to certain embodiments, the tab 216b at the second end 212 of the pull rod 210 can be positioned adjacent to a rear side 156 of the pin skirt 152. However, according to other embodiments, the pull rod 210 can be connected to one or both of the push wall 180 and the pin skirt 152. For example, as indicated by FIG. 7, according to certain embodiments, the tab 216b at the second end 212 of the pull rod 210 can be positioned within a portion of the pin skirt 152. Additionally, as shown in FIG. 6, according to certain embodiments, at least a portion of the pull rods 210 between the first and second ends 210, 212 of the pull rods 210 can each be slidingly housed within a pull rod guide recess 218 in the inner surface 144 of the top wall 124 of the housing 122.

According to the illustrated embodiment, as the slider assembly 164 is displaced in the first direction, and away from the first partition 134 and the plug head receptacle 140, the front face 184 of the push wall 180 is configured to at least eventually come into contact or engagement with the tab 216a at the first end 210 of the pull rod 210. As the slider assembly 164 continues to be displaced in the first direction, such contact or engagement of the front face 184 of the push wall 180 with the tab 216a at the first end 210 of the pull rod 210 can result in the push wall 180 pulling the pull rod 210 in the first direction. As the pull rod 210 is pulled in the first direction by the linear displacement of the push wall 180, at least a portion of the pull rod 210 between the first and second ends 210, 212 of the pull rod 210 can slide along the pull rod guide recess 218 in the inner surface 144 of the top wall 124 of the housing 122. Additionally, as the pull rod 210 is pulled in the first direction by the linear displacement of the push wall 180, the tab 216b at the second end 212 of the pull rod 210 can engage, or otherwise exert a force against, the pin skirt 152 in a manner that also facilitates displacement of the pin skirt 152 in the first direction and toward the opening 138 of the plug head receptacle 140. In instances in which the plug head 110 of the electrical charger unit 106 is positioned within the plug head receptacle 140, including instances in which the plug head 110 is electrically coupled to the electrical connectors 148 of the vehicle charger actuation device 102, such displacement of the pin skirt 152 in the first direction, and associated resulting displacement of the plug head 110, can facilitate a disconnection of the electrical connection between the plug head 110 of the electrical charger unit 106 and the vehicle charger actuation device 102, as well at least assist in the removal or ejection of the plug head 110 from the plug head receptacle 140. Moreover, as the pin skirt 152 is pulled in the first direction by the displacement of at least the pull rod(s) 210, the front face 184 of the pin skirt 152 can exert a force against and opposing surface of the plug head 110 that can at least assist in pulling the plug head 110 away from an electrical connection with the vehicle charger actuation device 102, as well as out of the plug head receptacle 140.

Conversely, when the plug head 110 is being inserted into the plug head receptacle 140, such as, for example, when the plug head 110 is being displaced in the second direction and into electrical engagement with the electrical connectors 148 in the plug head receptacle 140, the plug head 110 can exert a force against the front side 154 of the pin skirt 152 that similarly displaces the pin skirt 152 in the second direction. Such displacement of the pin skirt 152 can result in displacement of the pull rod(s) 210 in a similar direction. For example, according to embodiments in which the rear side 156 of the pin skirt 152 engages the tab 216b at the second end 212 of the pull rod 210, such engagement can result in the pin skirt 152 exerting a force against the pull rod 210 can results in the pull rod 210 being displaced in a similar direction. Additionally, the pull rod 210 can have a length such that, as the pull rod 210 is displaced in the second direction, the tab 216a at the first end 210 of the pull rod 210 does not engage the push wall 180 in a manner that can prevent or interfere with the pin skirt 152 being displaced to a location within the plug head receptacle 140 that can accommodate the plug head 110 being electrically coupled to the electrical connectors 148 in the plug head receptacle 140.

Figure 9A:
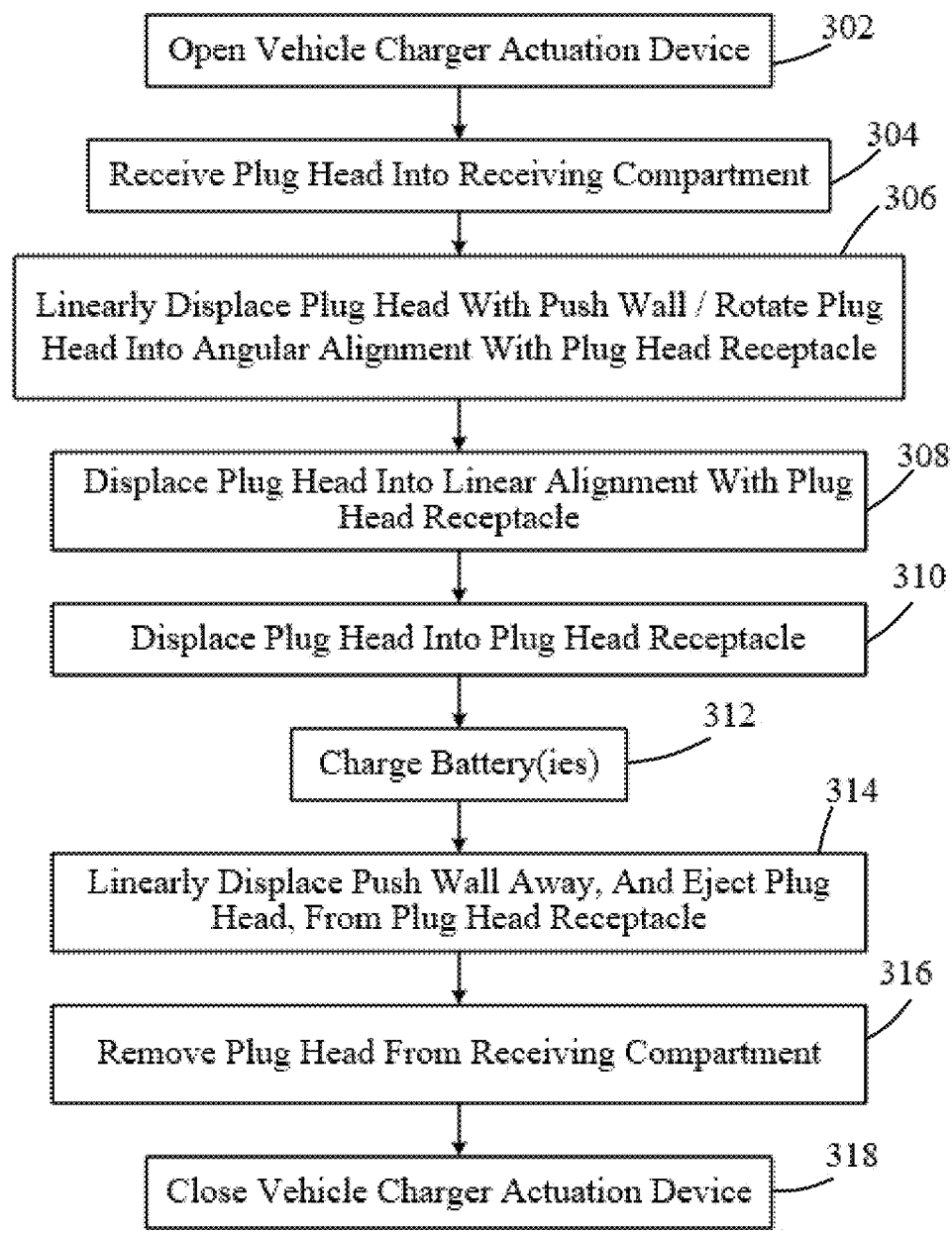
FIG. 9A illustrates a flow chart depicting an exemplary operational sequence of an exemplary vehicle charger actuation device according to an illustrated embodiment of the subject application.

FIGS. 9A and 9B illustrate a flow chart and an operational sequence, respectively, of an exemplary vehicle charger actuation device 102 according to an illustrated embodiment of the subject application. As shown in FIG. 9A, at step 302, the vehicle charger actuation device 102 can be opened. Such opening of the vehicle charger actuation device 102 can include the slider assembly 164 being displaced, via operation of drive assembly 186, away from a second position of the slider assembly 164 at which the push wall 180 of the slider assembly 164 is in relatively close proximity to, if not abuts, the above-discussed first partition 134, to a first position of the slider assembly 164. As previously discussed, the first position of the slider assembly 164 can correspond to the location at which the distance between the push wall 180 of the slider assembly 164 and the above-discussed first partition 134 is at its largest, which can correspond to the receiving compartment 132 providing its largest configuration. Thus, by linearly displacing the slider assembly 164 from the second position to the first position of the slider assembly 164, the receiving compartment 132 can be expanded to provide a relatively large area for placement of at least a portion of the plug head 110 of the electrical charger unit 106. Additionally, as discussed below with reference to FIGS. 11-13, such opening of the vehicle charger actuation device 102 can coincide with the openings of a cover 200, including, for example, a protective cover, of the vehicle charger actuation device 102, which may provide access for the plug head 110 to the receiving compartment 132 of the housing 122.

At step 304, with the slider assembly 164 at the first position, as shown, for example, at step 402 in the operational sequence depicted in FIG. 9B, the plug head 110 can be inserted into the receiving compartment 132 via operation of the electrical charger unit 106. Moreover, when the vehicle 104 is operably positioned relative the electrical charger unit 106, signals can be exchanged between components of the automatic electric vehicle charging system 100, including via use of the controller 114 and the transceiver 118, as well as via use of similar components of the electrical charger unit 106, that indicate that the slider assembly 164 is to be displaced to the first position, as well instruct the electrical charger unit 106 to operate in manner that places the plug head 110 into the receiving compartment 132.

At step 306, and as shown at step 404 in FIG. 9B, with the plug head 110 in the receiving compartment 132, the slider assembly 164 can begin being displaced in a second direction toward the second position of the slider assembly 164. Such timing of displacement of the slider assembly 164 can, according to certain embodiments, occur after sensors 120 of the vehicle charger actuation device 102 detect the presence of the plug head 110 in the receiving compartment 132. The controller 114 can receive information provided by the sensors 120 regarding the presence of the plug head 110 in the receiving compartment 132, and subsequently provide a signal that can be communicated to the encoder 194 of the driver 188 that facilitates operation of the driver 188 in manner that commences at least linear displacement of the first and second pinions 192a (or 192a'), 192b via engagement with the associated first and second racks 196a, 196b, and corresponding linear displacement of the slider assembly 164 toward the second position.

Further, the configuration of the rear or pushing face 182 of the push wall 180 relative to at least the first partition 134, as well as the configuration of the plug head 110, can facilitate the rear or pushing face 182 of the push wall 180 rotating the plug head 110 in at least the yaw direction, such as, for example, in a direction about the yaw axis 136 shown in FIG. 2, which is generally perpendicular to both the direction of travel of the push wall 180 and the illustrated top wall 124 of the housing 122. Such rotation of the plug head 110 via engagement with the pushing face can facilitate rotation of the plug head 110 into general alignment with the plug head receptacle 140. For example, as shown by at least FIG. 5, the rear or pushing face 182 of the push wall 180 is generally parallel to the first partition 134. Additionally, the plug head 110 can include a rear face 220 (FIG. 8A) having one or more surfaces that can engage the first partition 134 that is/are also generally parallel to the first partition 134, and an opposing front face 222 (FIG. 8B) that is engaged by the push wall that is also generally parallel to the rear or pushing face 182 of the push wall 180. Additionally, the plug head 110 can be pivotable or rotatable, such as, for example, operably connected to an extension arm 224 (FIG. 1) of the electrical charger unit 106 by a ball joint.

Accordingly, as the slider assembly 164 is linearly displaced in the second direction (as generally indicated by "$x_2$" at step 304 in FIG. 9), the rear or pushing face 182 of the push wall 180 comes into contact with the front face 222 (FIG. 8B) of the plug head 110 in a manner that rotates the plug head 110. Moreover, such rotation of the plug head 110 can result in the plug head 110 being rotated in the yaw direction until front face 222 of the plug head 110 is at an orientation that is parallel to the rear or pushing face 182 of the push wall 180. Such rotation of the plug head 110 can also result in the rear face 220 of the plug head 110 being generally aligned with, or parallel to, the first partition 134 and/or the opening 138 of the plug head receptacle 140. The slider assembly 164 can, according to certain embodiments, continue to be displaced toward the second position until the rear face 220 of the plug head 110 generally abuts, or otherwise is at least proximally adjacent to the first partition 134, as shown for example, in step 304 in FIG. 9. Further, according to certain embodiments, the sensors 120 can detect the position of the plug head 110 and or slider assembly 164 in a manner that can provide information used by the controller 114 to determine when to cease operation of the drive assembly 186, and moreover when to stop movement of the slider assembly 164 and/or plug head 110 in in a direction toward at least the first partition 134.

As indicted by step 308 in FIG. 9A, with the plug head 110 aligned in the yaw direction with at least the first partition 134 and/or pushing face 182 of the push wall 180, and with the plug head 110 at a location that is at least relatively close to, if not abutting, the first partition 134, the plug head 110 may need to be displaced in another, different direction (as generally indicated by the direction "y1" at step 406 in FIG. 9B). Moreover, as indicated by FIG. 9B, the plug head 110 may need to be linearly displaced in a direction that is general perpendicular to the direction at which the plug head 110 was displaced during step 304. Such perpendicular direction can be facilitated by operation of the electrical charger unit 106, including, for example, via associated displacement of the extension arm 224. Additionally, one or more of the sensors 120, such as, for example, proximity sensors, can provide information used by the electrical charger unit 106 determine the extent that the electrical charger unit 106 is to displace the plug head 110. Such displacement of the plug head 110 by the electrical charger unit 106 can include the electrical charger unit 106 moving the plug head 110 at step 306 to a position at which the plug head 110 is adjacent to the opening 138 of the plug head receptacle 140.

At step 310, information provided by at least the sensors 120 can indicate to the controller 114 that the plug head 110 is properly aligned in at least the yaw direction relative to at least the opening 138 to the plug head receptacle 140 and/or to the plug head receptacle 140, and/or that the plug head 110 is positioned adjacent to the opening 138 of the plug head receptacle 140. The controller 114 can then provide instructions of the drive assembly 186 to resume displacement of the slider assembly 164 toward the second position of the slider assembly 164. As the slider assembly 164 continues to be displaced to the second position, the pushing face 182 of the push wall 180 can exert a force against the plug head 110 that pushes the plug head 110 into the plug head receptacle 140, as shown for example by step 408 in FIG. 9B, such that the electrical connector(s) 150 of the plug head 110 becomes electrically coupled to the electrical connector(s) 148 the plug receptacle 140.

Such displacement of the plug head 110 into the plug head receptacle 140 can also result in the plug head 110 exerting a force against the pin skirt 152 such that the pin skirt 152 is displaced within the plug receptacle 140 from a first position to a second position of the pin skirt 152. Additionally, as the pin skirt 152 is displaced toward the second position, the rear face 156 of the pin skirt 152 can, if not already connected to the second end 214 of the pull rod 210, engage the second tab 216*b* of one or more pull rods 210 such that the pull rods 210 are displaced in a direction similar to the direction of displacement of the pin skirt 152. As previously mentioned, such displacement of the pull rods 210 can, according to at least certain embodiments, result in displacement of at least a portion of the pull rods 210 in pull rod guide recesses 218 in the top wall 124 of the housing 122.

With the electrical connector(s) 150 of the plug head 110 electrically coupled to the electrical connector(s) 148 the plug receptacle 140, at step 312 in FIG. 9A (step 410 in FIG. 9B) electrical power can flow through the electrical charger unit 106 and to the vehicle charger actuation device 102, and be delivered to the one or more batteries 108 of the vehicle 104. Moreover, at step 310, charging of the one or more batteries 108 of the vehicle 104 via use of electrical power delivered through at least the electrical charger unit 110 can commence.

At step 312, the slider assembly 164 can be displaced from the second position to the first position of the slider assembly 164 via operation of the drive assembly 186. For example, upon completion of the charging procedure of step 310, the controller 114 can issue a signal to the encoder 194 that can initiation operation of the driver 188 in a manner that can facilitate displacement of the slider assembly 164 in a first direction (as generally indicated by "$x_1$" at step 412 in FIG. 9B) that displaces the push wall 180 in a direction away from the plug head receptacle 140.

As demonstrated by FIGS. 10A-10D, during the progression of the slider assembly 164 from the second position to the first position, as the push wall 180 is displaced, the front face 184 of the push wall 180 can be moved into contact the first tab 216*a* at the first end 212 of the pull rod(s) 210 such that continued displacement of the push wall 180 causes the pull rod(s) 210 to be displaced in a similar direction. Further, such displacement of the pull rod(s) 210 can result in the second end 214 of the pull rod(s) 210, and/or the second tab 216*b* at the second end 214, exerting a force against the pin skirt 152 that causes the pin skirt 152 to be displaced in a similar direction and toward the opening 138 of the plug head receptacle 140. Such displacement of the pin skirt 152 toward the opening 138 of the plug head receptacle 140 can result in the pin skirt 152 contacting the plug head 110 in a manner that cause the plug head 110 to be displaced in a direction away from, and eventually out of, the pin head receptacle. Moreover, such displacement of the pin skirt 152 can cause the pin skirt 152 to exert a force against the plug head 110 that causes the plug head 110 to be displaced in a manner that results in the electrical connector(s) 150 of the plug head 110 being electrically disconnected from the electrical connector(s) 148 the plug receptacle 140, as well as an ejection of the plug head 110 from the plug head receptacle 140 and into the receiving compartment 132.

Figure 10C:
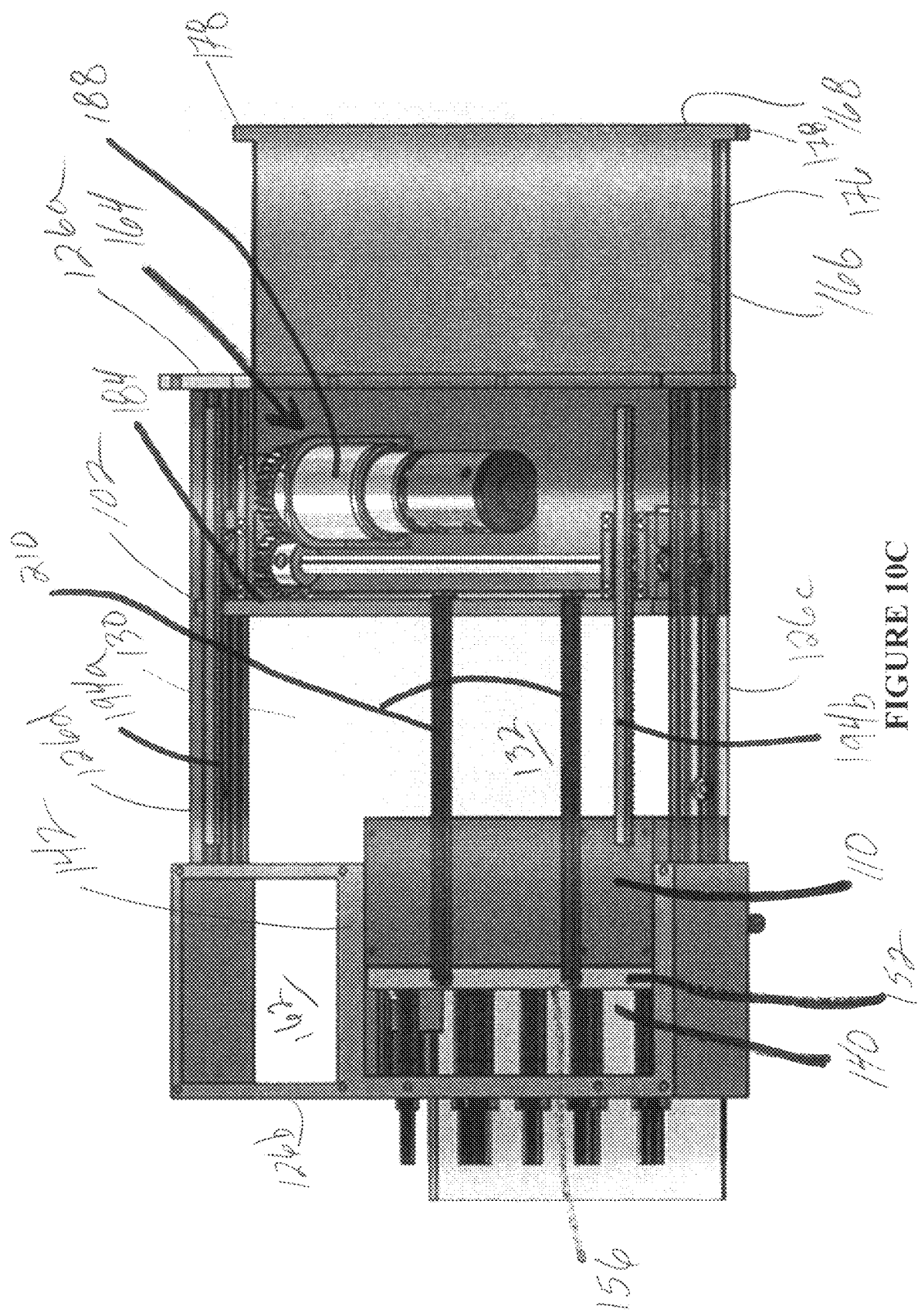
Figure 10D:
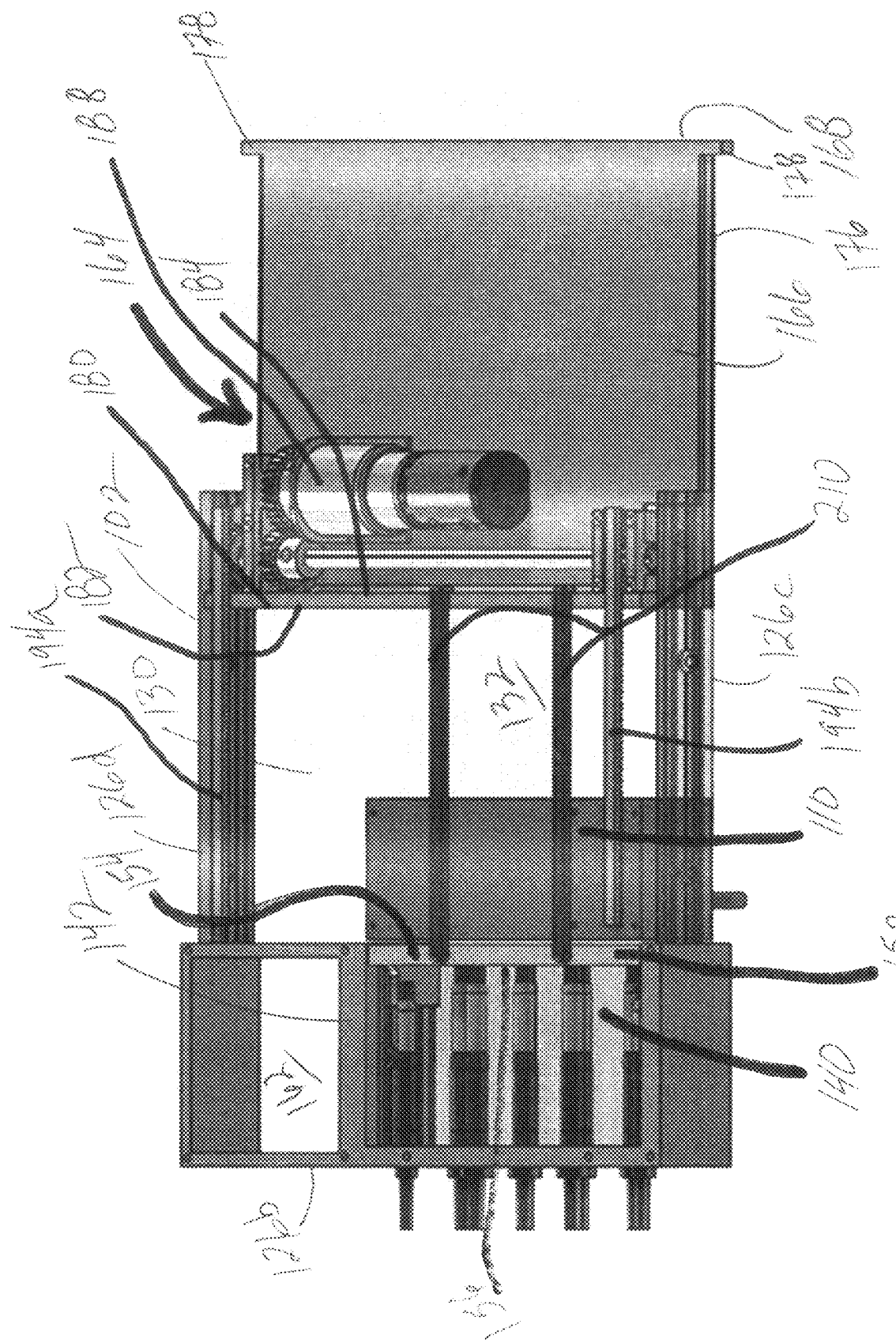

With the plug head 110 removed from the plug head receptacle 140, as shown, for example, in FIG. 10D, at step 316 (FIG. 9A), the electrical charger unit 106 can be operated to remove the plug head 110 from the receiving compartment 132, and thus from the vehicle charger actuation device 102. With the plug head 110 removed from the vehicle charger actuation device 102, the controller 114 can, according to certain embodiments, provide a signal for the encoder 194 indicating that the slider assembly 164 is to again be displaced to the second position via operation of the drive assembly 186, as shown in steps 318 and 414 in FIGS. 9A and 9B, respectively.

Figure 11:
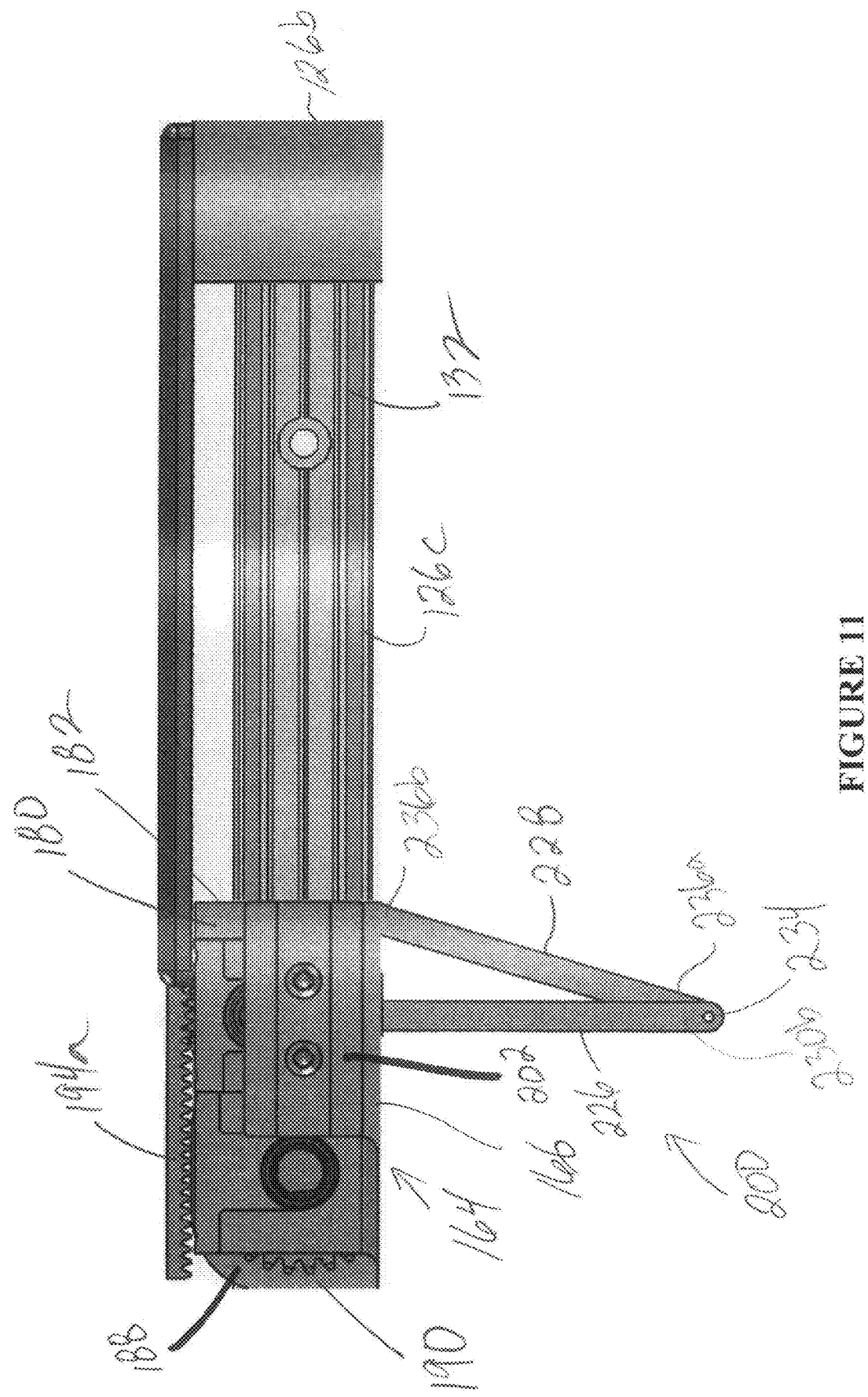
FIGS. 11 and 12 illustrate side views of a portion of a vehicle charger actuation device that includes a downward hinging cover that is shown in the open and closed positions, respectively, according to an illustrated embodiment of the subject application.
Figure 12:
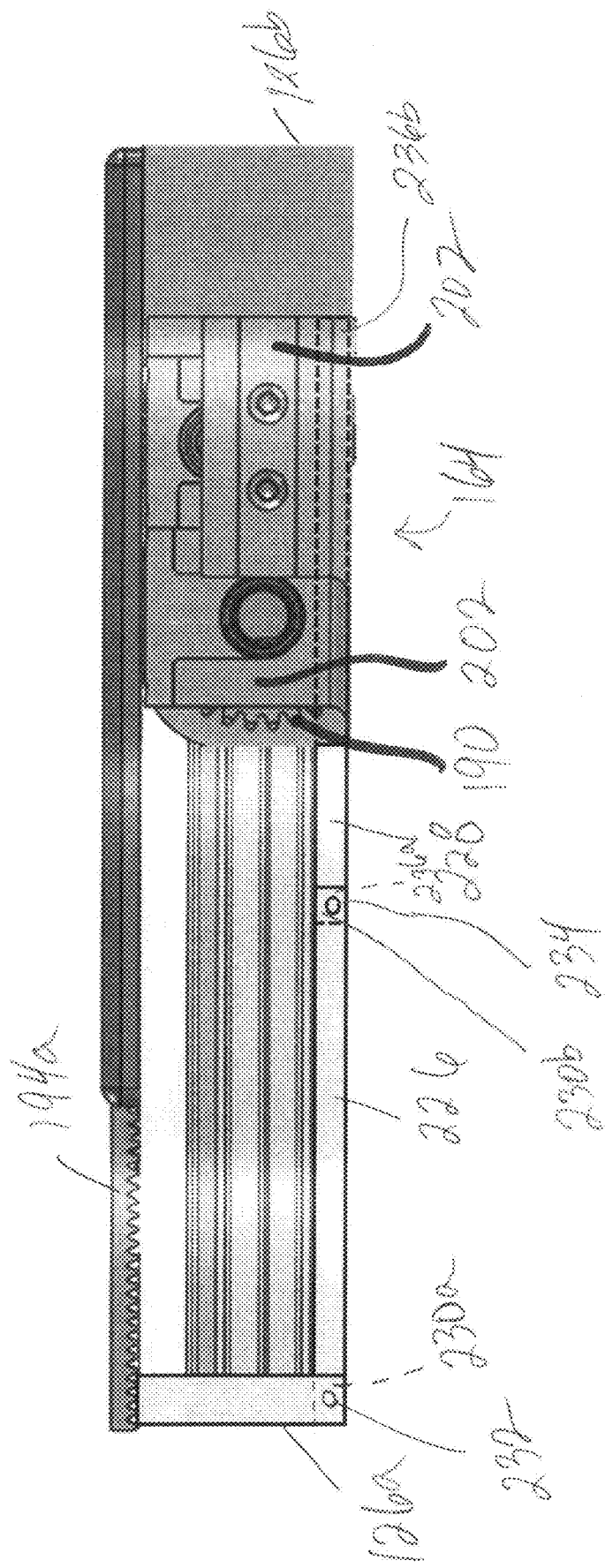
Figure 13:
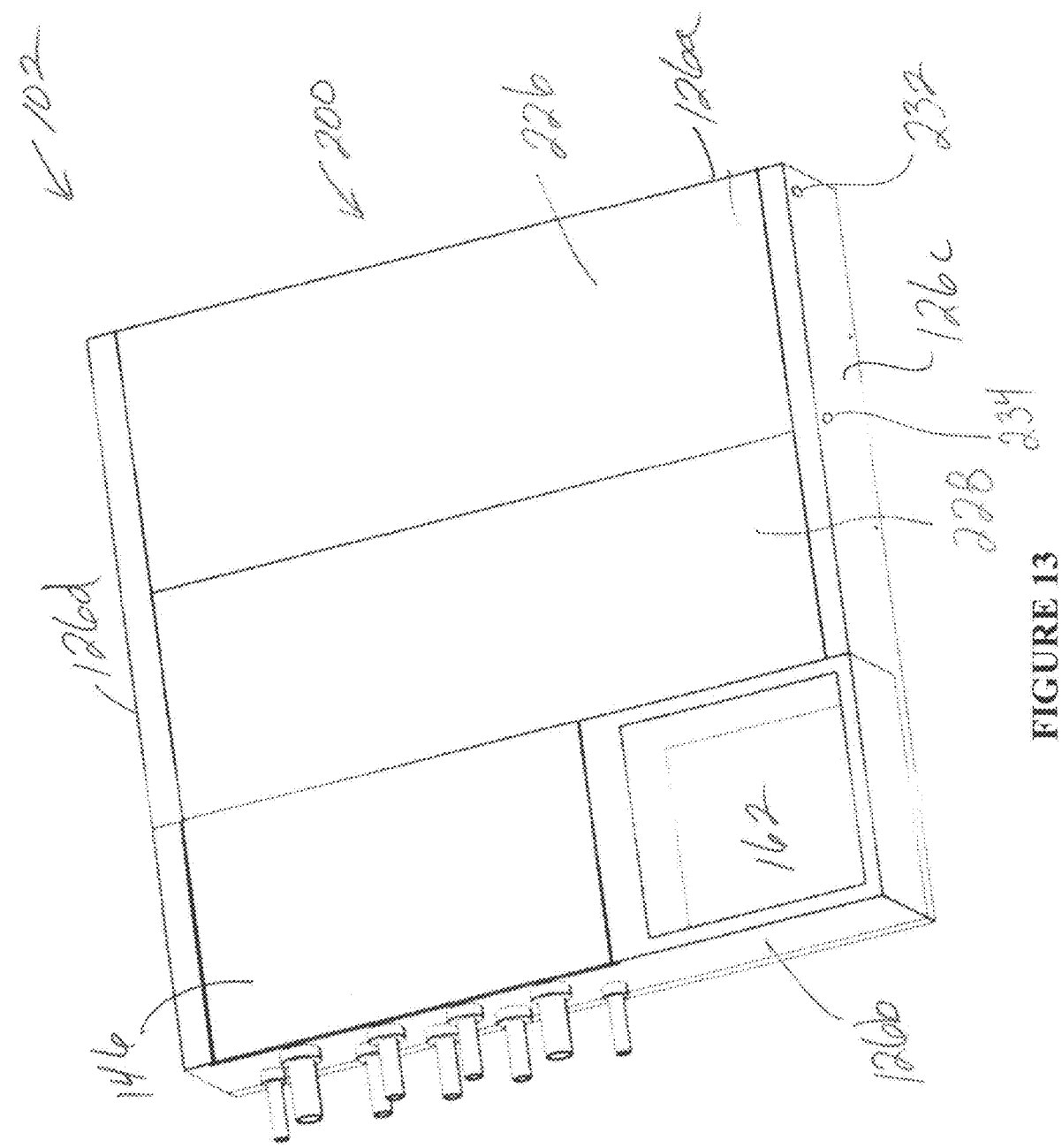
FIG. 13 illustrates a bottom side perspective view of a vehicle charger actuation device with the cover of FIGS. 11 and 12 in a closed position.

FIGS. 11-13 illustrate an exemplary cover 200 that can be coupled to the vehicle charger actuation device 102. The cover 200 can, according to certain embodiments, be coupled to a bottom side of the housing 122 such that the cover 200 and the top wall 124 are at opposing sides of the housing 122. Thus, at least a portion of the cover 200 can extend over at least the opening 128 of the housing 122, and be positioned to provide at least some protection to the vehicle charger actuation device 102 against external debris and other containments that, for example, may rise up from the ground surface 112 in a direction toward the vehicle charger actuation device 102 as the vehicle 104 is operated, such as, for example, during normal driving operations of the vehicle 104.

According to the illustrated embodiment, the cover 200 can be a downward hinging cover that includes a first arm 226 and a second arm 228. A first end 230a (FIG. 12) of the first arm 226 can be pivotally coupled to a portion of the housing 122 that remains at a relatively static position relative to at least the slider assembly 164. For example, according to certain embodiments, the first end 230a of the first arm 226 can be pivotally coupled, such as, for example, by a pin (FIGS. 12 and 13), to a portion of the first and second sidewalls 126c, 126d of the housing 122 that are adjacent to the front sidewall 126a of the housing 122. Alternatively, according to other embodiments, the first end 230a of the first arm 226 can be pivotally coupled to the front sidewall 126a. A second end 230b of the first arm 226 can be pivotally coupled, such as, for example, via a pin 234, to a first end 236a of the second arm 228, as shown for example in at least FIG. 11. Additionally, a second end 236b of the second arm 228 can be pivotally coupled to the slider assembly 164, including, for example, around the second end 170 of the base 166 and/or to the push wall 180. Such a connection between the second end 236b of the second arm 228 to the slider assembly 164 can, according to certain embodiments, be by a pin or other connection that can be similar to the previously discussed pins 232, 234.

As shown by FIG. 11, when the slider assembly 164 is at the first position such that the receiving compartment 132 is accessible through the opening 128 of the housing 122, the cover 200 can be in an open position. According to the illustrated embodiment, when the closer 200 is in the open position, the first and second arms 226, 228 can both be in retracted positions. When retracted, the first and second arms 226, 228 may extend from the vehicle charger actuation device 102 in generally downward directions toward the adjacent ground surface 112. Additionally, when in the retracted position, the first and second arms 226, 228 can be positioned underneath the push wall 180 and/or base 166, and not underneath the open area of the receiving compartment 132, so as to prevent the first and second arms 226, 228 from interfering with the displacement of the plug head 110 into the receiving compartment 132.

Conversely, when the slider assembly 164 is displaced from the first position and toward the second position of the slider assembly 164, the closer 200 can be displaced with the slider assembly 164 to a closed position, as shown in FIGS. 12 and 13. For example, as the slider assembly 164 is displaced in the direction indicated in step 312 in FIG. 9 after completion of a charging operation, the closer 200 can be displaced with the slider assembly 164 to the closed position. As the slider assembly 164 is displaced toward the closed position, the first and second arms 226, 228 of the closer 200 are each pivotally displaced about their respective pins 322, 324 from the retracted position to an extended position. When in the extended position, the first and second arms 226, 228 can generally lie along the same plane such that the cover 200 extends over at least a portion of the area that is defined by the sidewalls 126a-d of the housing 122, thereby providing a cover to the underside of the vehicle charger actuation device 102. Upon subsequent displacement of the slider assembly 164 back toward the first position, as shown for example in FIGS. 10A-D, the first and second arms 226, 228 of the closer 200 can each again be pivoted in a generally downwardly to the retracted position, thereby exposing the opening 128 and the receiving compartment 132 in a manner that can again accommodate the plug head 110 being moved by the electrical charger unit 110 into the receiving compartment 132, as well as accommodate subsequent operations that displace the plug head 110 to a position at which the plug head 110 is electrically coupled to the vehicle charger actuation device 102.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A vehicle charger actuation device for selective electrical coupling to a plug head of an electrical charging unit, the vehicle charger actuation device comprising:
    a housing having an interior region;
    a plug head receptacle having an electrical connector configured for electrical coupling to the plug head of the electrical charging unit;
    a slider assembly having a push wall, the push wall being linearly displaceable within the interior region of the housing and having a pushing face configured to facilitate rotation of the plug head into angular alignment with the plug head receptacle;
    a drive assembly configured to selectively displace the slider assembly within the interior region;
    a pin skirt that is slideably displaceable within the plug head receptacle; and
    at least one pull rod having a first end and a second end, the first end being positioned at a location of within the interior region at which the first end is contacted by the slider assembly as the slider assembly is linearly displaced in a first direction away from the plug head receptacle, the second end being engaged with the pin skirt at least while the first end is contacted by the slider assembly such that linear displacement of the slider assembly in the first direction is transmitted via the at least one pull rod to the pin skirt to displace the pin skirt in the first direction.

2. The vehicle charger actuation device of claim 1, wherein the slider assembly is displaceable between a first position and a second position by operation of the drive assembly, the push wall being separated from at least the plug head receptacle by a first distance when the slider assembly is at the first position that provides a receiving compartment within the interior region having a size that can receive placement of the plug head by the electrical charging unit in a variety of yaw orientations relative to the vehicle charger actuation device, the push wall being adjacent to at least the plug head receptacle when the slider assembly is at the second position.

3. The vehicle charger actuation device of claim 1, wherein the drive assembly includes a first pinion that matingly engages a first rack, and a second pinion that matingly engages a second rack, the first and second pinions being positioned on opposing ends of the push wall.

4. The vehicle charger actuation device of claim 3, wherein the housing includes a top wall, the top wall having a first recess to house at least a portion of the first rack and a second recess to house at least a portion of the second rack.

5. The vehicle charger actuation device of claim 3, wherein the drive assembly further includes an electric motor that is provides a force that is transmitted to the first and second pinions.

6. The vehicle charger actuation device of claim 3, wherein the first pinion is connected to the second pinion by a drive shaft.

7. The vehicle charger actuation device of claim 1, wherein the slider assembly further includes a base, and wherein a first sidewall and a second sidewall of the housing each include a base guide recess that at least assists in guidance of linear displacement of the base as the slider assembly is displaced between first and second positions.

8. The vehicle charger actuation device of claim 7, wherein the housing includes a top wall, the top wall including a pull rod guide recess for each pull rod of the at least one pull rod.

9. The vehicle charger actuation device of claim 1, further including a cover, the cover being displaceable from a closed position at which the cover extends across at least a portion of the interior region of the housing to an open position at which the cover extends downwardly away from the housing.

10. The vehicle charger actuation device of claim 9, wherein the cover is a downwardly hinging cover that includes a first arm that is pivotally coupled to a second arm, the second arm being pivotally coupled to the slider assembly.

11. A method comprising:
receiving, into a receiving compartment of a vehicle charger actuation device, a plug head of an electrical charging unit for an electric vehicle;
displacing a push wall of a slider assembly of the vehicle charger actuation device toward a plug head receptacle of the vehicle charger actuation device, the plug head receptacle having an electrical connector configured for electrical coupling to the plug head;
aligning, via contact between the plug head and the push wall as the slider assembly is displaced toward the plug head receptacle, a yaw orientation of the plug head relative to at least the plug head receptacle;
pushing, via displacement of the slider assembly toward the plug head receptacle, the plug head into electrical contact with the electrical connector of the plug head receptacle;
displacing a pin skirt away from an opening of the plug head receptacle as the plug head is displaced into electrical contact with the electrical connector of the plug head receptacle;
displacing the push wall away from the plug head receptacle;
pulling, by contact of the slider assembly with a pull rod as the slider assembly is displaced away from the plug head receptacle, the pin skirt toward the opening of the plug head receptacle; and
displacing, by contact between the pin skirt and the plug head as the pin skirt is pulled toward the opening of the plug head receptacle, the plug head out of the plug head receptacle.

12. The method of claim 11, further include the step of receiving, by the vehicle charger actuation device, an electric current through the electrical contact between the plug head and the electrical connector of the plug head receptacle.

13. The method of claim 11, wherein the steps of displacing the push wall toward, and away from, the plug head receptacle both include operating a drive assembly of the of the vehicle charger actuation device.

14. The method of claim 13, wherein operating the drive assembly includes rotating a first pinion and a second pinion around opposing ends of the push wall, the first pinion being rotated along a first rack and the second pinion being rotated along a second rack.

15. The method of claim 14, wherein rotating the first pinion and the second pinion comprises transmitting a rotational force from the first pinion to the second pinion via a drive shaft.

16. The method of claim 11, wherein displacement of the slider assembly includes linearly displacing a base of the slider assembly along a guide recess in at least a pair of sidewalls of a housing of the vehicle charger actuation device.

17. The method of claim 11, wherein the step of displacing the plug head out of the plug head receptacle includes disconnecting the plug head from electrical contact with the electrical connector of the plug head receptacle.

18. The method of claim 11, further including the step of linearly displacing, via operation of the electrical charging unit, the plug head to a position at which the plug head is adjacent to the opening of the plug head receptacle, the linear displacement of the plug head by the electrical charging unit being in a direction that is generally perpendicular to the direction at which the push wall is displaced as the push wall moves toward the plug head receptacle.

19. The method of claim 11, further including the steps of retracting a cover of the vehicle charger actuation device away from the receiving compartment as the push wall is displaced away from the plug head receptacle, and expanding the cover over at least a portion of the vehicle charger actuation device as the push wall is displaced toward the plug head receptacle.

20. The method of claim 19, wherein the step of retracting the cover comprises pivotally displacing a first arm and a second arm in a downwardly direction away from the receiving compartment.

* * * * *